(12) United States Patent
Zarn

(10) Patent No.: US 10,110,688 B2
(45) Date of Patent: Oct. 23, 2018

(54) SYSTEM AND METHOD FOR REMOTE MONITORING OF API PERFORMANCE AND USER BEHAVIOR ASSOCIATED WITH USER INTERFACE

(71) Applicants: SONY CORPORATION, Tokyo (JP); SONY NETWORK ENTERTAINMENT INTERNATIONAL LLC, Los Angeles, CA (US)

(72) Inventor: Miles Zarn, San Jose, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 178 days.

(21) Appl. No.: 15/073,128

(22) Filed: Mar. 17, 2016

(65) Prior Publication Data

US 2016/0277264 A1   Sep. 22, 2016

Related U.S. Application Data

(60) Provisional application No. 62/136,214, filed on Mar. 20, 2015.

(51) Int. Cl.
*G06F 15/173* (2006.01)
*H04L 29/08* (2006.01)
*H04L 12/26* (2006.01)

(52) U.S. Cl.
CPC ........ *H04L 67/22* (2013.01); *H04L 29/08099* (2013.01); *H04L 29/08675* (2013.01); *H04L 43/08* (2013.01); *H04L 67/025* (2013.01)

(58) Field of Classification Search
CPC ............................. H04L 67/22; H04L 67/025
See application file for complete search history.

(56) References Cited

U.S. PATENT DOCUMENTS

| | | | |
|---|---|---|---|
| 5,432,932 A * | 7/1995 | Chen .................... | G06F 11/0715 702/179 |
| 7,072,800 B1 * | 7/2006 | Fernandez .......... | G06F 11/3414 702/186 |
| 8,666,844 B2 | 3/2014 | Shaya et al. | |
| 9,077,479 B2 * | 7/2015 | Kotrla ................. | H04L 41/5019 |

(Continued)

FOREIGN PATENT DOCUMENTS

CN          103166827 A      6/2013

*Primary Examiner* — Michael Y Won
(74) *Attorney, Agent, or Firm* — Chip Law Group

(57) ABSTRACT

Various aspects of a system and a method to remotely monitor API performance and user behavior associated with a user interface (UI) are disclosed herein. In accordance with an embodiment, the system includes a server that includes registration of a metric associated with performance of an application program interface (API) and/or the UI associated with a client device. The metric may be registered as a unique namespace information value. A numeric value is assigned to the registered metric to associate the assigned numeric value with the registered metric. The assigned numeric value associated with the registered metric is synchronized at the client device and the server. The performance of the API and/or the UI associated with the client device is determined based on receipt of the assigned numeric value from the client device.

17 Claims, 11 Drawing Sheets

(56) References Cited

U.S. PATENT DOCUMENTS

| | | | |
|---|---|---|---|
| 2001/0039481 A1* | 11/2001 | Tremblay | C25B 15/02 702/35 |
| 2004/0064552 A1* | 4/2004 | Chong | G06F 11/3006 709/224 |
| 2004/0139186 A1* | 7/2004 | Lee | G06F 11/3409 709/223 |
| 2005/0033766 A1* | 2/2005 | Pang | G06F 11/3409 |
| 2005/0081010 A1* | 4/2005 | DeWitt, Jr. | G06F 11/348 711/165 |
| 2005/0091346 A1* | 4/2005 | Krishnaswami | G06F 9/44505 709/220 |
| 2006/0179116 A1* | 8/2006 | Speeter | G06F 8/71 709/217 |
| 2008/0052628 A1* | 2/2008 | Bugenhagen | H04L 41/0896 715/736 |
| 2010/0091676 A1* | 4/2010 | Moran | H04L 47/10 370/252 |
| 2010/0325168 A1 | 12/2010 | Luth et al. | |
| 2011/0055838 A1* | 3/2011 | Moyes | G06F 9/4881 718/102 |
| 2011/0270966 A1* | 11/2011 | Zhou | H04L 41/0213 709/224 |
| 2012/0158566 A1* | 6/2012 | Fok | G06Q 40/00 705/35 |
| 2013/0275585 A1* | 10/2013 | Santhanakrishnan | G06F 11/3476 709/224 |
| 2014/0282422 A1* | 9/2014 | Tuffs | G06F 11/3428 717/127 |
| 2014/0379901 A1* | 12/2014 | Tseitlin | H04L 43/08 709/224 |
| 2015/0220354 A1* | 8/2015 | Nair | G06F 13/28 710/301 |
| 2015/0254791 A1* | 9/2015 | Stockton | G06Q 50/18 705/7.28 |
| 2016/0246647 A1* | 8/2016 | Harris | G06F 9/5027 |
| 2016/0277264 A1* | 9/2016 | Zarn | H04L 67/22 |

\* cited by examiner

SYSTEM AND METHOD FOR REMOTE MONITORING OF API PERFORMANCE AND USER BEHAVIOR ASSOCIATED WITH USER INTERFACE

CROSS-REFERENCE TO RELATED APPLICATIONS/INCORPORATION BY REFERENCE

The present application claims priority to U.S. Provisional Application Ser. No. 62/136,214, filed Mar. 20, 2015, the disclosure of which is herein incorporated by reference in its entirety

FIELD

Various embodiments of the disclosure relate to remote monitoring of application program interface (API) performance. More specifically, various embodiments of the disclosure relate to remote monitoring of API performance and user behavior associated with a user interface (UI).

BACKGROUND

Technological convergence and emerging network architectures have made possible the provision of various products and/or services desired by consumers, via the Internet. The steps or processes that a user goes through at the time of a product purchase or a user experience while interacting with a user interface (UI) to access various types of information, may be referred to as user behavior. There may be certain factors that may influence the decisions of the user. Various providers of Internet services (who sell related products and devices) and website owners may want to understand the factors that influence consumer decision-making with regard to purchase of their products and/or services and/or the way their products or services are used.

In certain scenarios, it may be desirable to understand aid analyze how the consumers use Internet services and related products and devices to better tailor their products and/or services. Further, it may be desirable to understand user behavior on the UI used to interact with a device or to access such Internet services and related products. It is observed that UI latency directly impacts the user experience. The user experience related to the use of the Internet services at the device may further depend on the performance of the API(s) at the device. It may be required to measure aid report performance related to various parts of the UI and the API(s). It may be difficult to identify and thereby prioritize and solve critical problems faced by the users during use of such internet services, products, and related devices. The difficulties may be exacerbated when the understanding of metrics related to performance of various parts of the UI aid the API(s) is ambiguous. The current systems may not provide a correct understand rig or measurement, which in Sum may adversely impact the user experience. Thus, an improved, cost-effective, aid scalable system may be required to monitor performance of the various APIs and user behavior associated with one or more UIs.

Further limitations and disadvantages of conventional and traditional approaches will become apparent to one of skin in the art, through comparison of described systems with some aspects of the present disclosure, as set forth in the remainder of the present application and with reference to the drawings.

SUMMARY

A system aid a method are provided to remotely monitor API performance and user behavior associated with a user interface (UI) substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
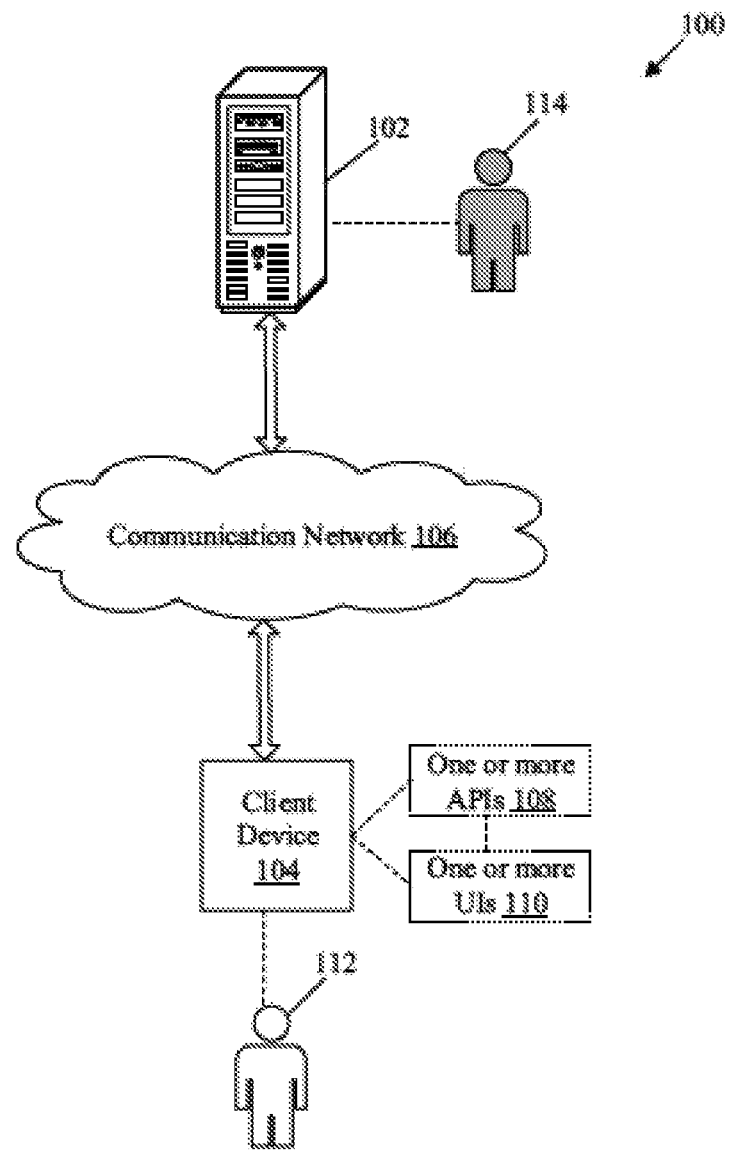
FIG. 1 is a block diagram that illustrates a network environment to remotely monitor API performance and user behavior associated with a user interface (UI), in accordance with an embodiment of the disclosure.

The following described implementations may be found in the disclosed system and method to remotely monitor application program interface (API) performance and user behavior associated with a user interface (UI). Exemplary aspects of the disclosure may include registration of a metric associated with performance of an API and/or a UI associated with a client device. The metric may be registered as a unique namespace information value. A numeric value may be assigned to the registered metric to associate the assigned numeric value with the metric registered as the unique namespace information value. The assigned numeric value associated with the registered metric may be synchronized at the client device aid a server. The performance of the API aid/or the UI associated with the client device may be determined based on receipt of the assigned numeric value from the client device.

In accordance with an embodiment, a plurality of numeric values that include the assigned numeric value may be received from the client device. The plurality of numeric values may correspond to a transport protocol version, a type of data packet, a session identifier (ID), and a session sequence number. The plurality of numeric values may further correspond to a timestamp of a first metric, an application build version value, a client device ID, a current metric numeric value, a previous metric numeric value, a latency value, and/or a time offset value from the timestamp of the first metric.

In accordance with an embodiment, the server may be a namespace server, a Hypertext Transfer Protocol (HTTP) web server, an application server, a cluster-computing device, and/or a database server. A latency of a first load of me registered metric may be determined in the client device in a session based on a plurality of numeric values received from the client device. An average latency of a first load of each registered metric of the plurality of registered metrics may be determined in the client device. The average latency of the first load of each registered metric may be determined per session, based on the plurality of numeric values received from the client device.

In accordance with an embodiment a count related to number of times the UI of one or more UIs may be accessed per session, may be determined. A visualization of a navigation flow between the one or more UIs in the session may be generated. A source of traffic to the UI of the one or more UIs may be identified.

In accordance with an embodiment, a latency of the API may be determined when the client device invokes a plurality of serial calls to a plurality of APIs. The latency of the API may be determined based on the plurality of numeric values received from the client device. The API may be identified that exhibits a higher latency in comparison to other APIs when the client device invokes a plurality of parallel calls to the plurality of APIs. The API may be identified based on the plurality of numeric values received from the client device.

In accordance with an embodiment time spent on each element, of a navigation flow and/or a total time spent on a plurality of elements of the navigation flow, may be determined in the session. Such a determination may be based on the plurality of numeric values received from the client device. One or more reports related to the performance of the API and/or user behavior associated with the UI may be dynamically generated. The one or more reports may be generated based on a conversion of the plurality of numeric values received from the client device to a plurality of metrics by use of the unique namespace information value that corresponds to each metric.

In accordance with an exemplary aspect of the disclosed embodiment, one or more metrics associated with performance of one or more APIs and/or one or more UIs associated with the client device may be registered. A unique numeric value may be assigned to each of the one or more registered metrics. For a plurality of registered metrics, a plurality of numeric values from the client device may be received. Each of the received plurality of numeric values may correspond to a registered metric of the one or more registered metrics. Based on the received plurality of numeric values for one or more other sessions of a plurality of sessions, a missing sequence value associated with recent of data for the session from the client device may be determined. The missing sequence value may correspond to a deviation from a pre-specified sequence for the recent of the data for each session of the plurality of sessions.

In accordance with an embodiment, each of the one or more metrics may be registered as a unique namespace information. In accordance with an embodiment, the one or more UIs may correspond to one or more cross-linked web pages or one or more UIs of a software application accessed from the client device. The one or more cross-linked web pages may include one or more functional regions in each webpage.

In accordance with an embodiment a number of missing sequence values with respect to a count of the plurality of sessions may be computed for a user-defined time period. The computed number of missing sequence values may be a quality indicator for data received from the client device. An alert may be generated when the computed number is above a predefined threshold.

In accordance with an embodiment, a missing sequence associated with a navigation flow within a first UI of the one or more UIs may be determined. Further, the missing sequence associated with the navigation flow from the first UI to a second UI of the one or more UIs may be determined. Such determination of missing sequenced) may be based on the received plurality of numeric values. The missing sequence may correspond to a deviation from one or more pre-specified navigation flows. The one or more pre-specified navigation flows may be related to a sequence of visits to functional regions associated with the one or more UIs in the session.

In accordance with an embodiment, the navigation flow within the first UI of the one or more UIs may correspond to navigation from one functional region of the first UI to another functional region of the first UI. A collective metric associated with a plurality of client devices may be determined. The collective metric may be determined based on an aggregation and/or filtering of the plurality of numeric values received from the client device and other plurality of numeric values received from other client devices of the plurality of client devices.

In accordance with another exemplary aspect of the disclosed embodiment a client device may be provided that may be communicatively coupled to the server. One or more circuits in the client device may be configured to detect a start tone and an end time of the session, based on an initiation of a user activity and/or inactivity for a pre-defined threshold time on a UI. A new session ID may be generated based on the detected start time and the end time of the session. In accordance with an embodiment, a latency value associated with performance of an API and/or the UI associated with the client device, may be measured. The measured latency value may be stored as a numeric value that corresponds to a metric. A plurality of numeric values that includes the stored numeric value may be communicated to the server.

FIG. 1 is a block diagram that illustrates a network environment to remotely monitor API performance and user behavior associated with a UI, in accordance with an embodiment of the disclosure. With reference to FIG. 1, there is shown an exemplary network environment 100. The network environment 100 may include a server 102, one or more client devices, such as a client device 104, a communication network 106, and one or more users, such as a first user 112 and a second user 114. There is further shown one or more APIs 108 and one or more UIs 110, associated with the client device 104. The first user 112 may be a consumer associated with the client device 104. The second user 114 may be an engineering resource associated with the server 102. The server 102 may be communicatively coupled to the one or more client devices, such as the client device 104, via the communication network 106.

Figure 3:
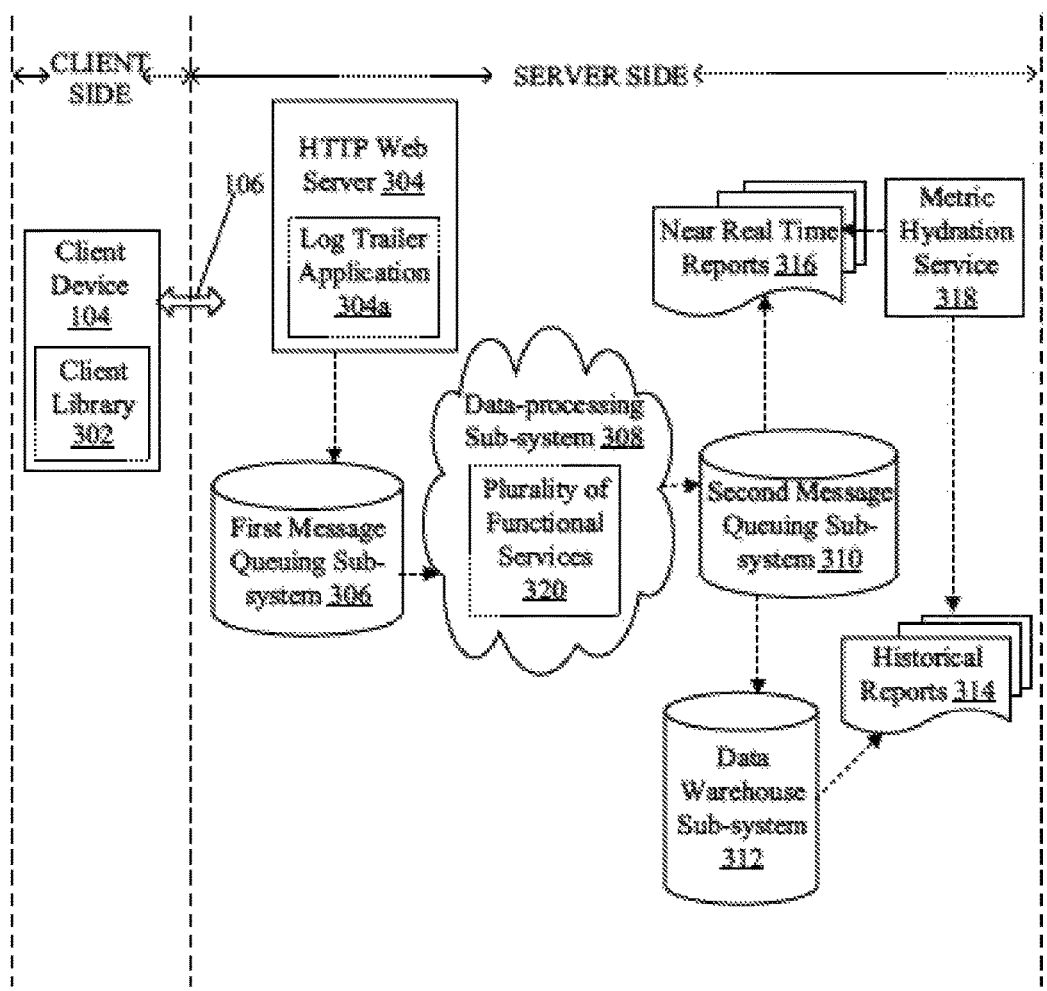
FIG. 3 illustrates an exemplar/implementation of the disclosed system and method in a distributed computing environment, to remotely monitor API performance and user behavior associated with a UI, in accordance with an embodiment of the disclosure.

The server 102 may comprise suitable logic, circuitry, interfaces, and/or code that may be configured to remotely monitor performance of the one or more APIs 108, associated with the client device 104. The server 102 may be configured to remotely monitor performance and/or behavior of a user, such as me first user 112, associated with the one or more UIs rendered on the client device 104. In accordance with an embodiment, the server 102 may be implemented in a distributed architecture (as shown in FIG. 3). Examples of the server 102 may include, but are not limited to, a namespace server, an http web server, a database server, a duster-computing device, a file server, an application server, and/or their combination.

The client device 104 may comprise suitable logic, circuitry, interfaces, and/or code that may be configured to determine a session, based on an initiation of a user activity and/or inactivity on at least one of the one or more UIs 110 for a pre-defined threshold time. Examples of the client device 104 may include, but are not limited to, a user terminal, a gaming device, a smart television (TV), Internet Protocol television (IPTV), a web surfing device, a tablet computer, a laptop, a smartphone, a display device, and/or a computing device.

The communication network 106 may module a medium through which the server 102, and the one or more client devices, such as the client device 104, may communicate with each other. The communication network 106 may be a wired or wireless communication network. Examples of the communication network 106 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the internet. Various devices in the network environment 100 may be configured to conned to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The one or more APIs 108 may comprise a set of instructions, a set of routines, logic, protocols, and/or tools that specifies interaction of software components. Each of the one or more APIs 108 may be programmed to carry out a specific function, such as measurement of the latency of a metric. The one or more APIs 108 may be the client APIs associated with the client device 104. The one or more APIs 108 may interact with an operating system, an application, a website, and/or the one or more UIs 110 of the client device 104. An example of the one or more APIs 108 of the client device 104 is described in Table 3 in FIG. 3.

The one or more UIs 110 may correspond to a client web browser to access Internet services from the client device 104. In accordance with an embodiment, the one or more UIs 110 may be one or more UIs of a software application accessed from the client device 104. In accordance with an embodiment, the one or more UIs 110 may be one or more cross-linked webpages that include one or more functional regions in each webpage.

In operation, the server 102 may be configured to register a metric associated with performance of an API and/or a UI. The API and the UI may be one of the one or more APIs 108 and the one or more UIs 110, associated with the client device 104. The metric may be registered as a unique namespace information. In accordance with an entailment, the server 102 may be configured to register a plurality of metrics associated with performance of the one or more APIs 108. The plurality of metrics associated with the one or more UIs 110 may also be registered.

In accordance with an embodiment the server 102 may be configured to assign a unique numeric value to each of the one or more registered metrics. The numeric value may be assigned to associate the numeric value with a corresponding registered metric. In accordance with an embodiment, the server 102 may be configured to synchronize the assigned numeric value associated with the registered metric at the client device 104 and the server 102. In other words, each metric may be mapped to a numeric value. Accordingly, a relationship may be established between the assigned numeric value and a literal name of the registered metric, on both the client device 104 and the server 102.

In accordance with an embodiment the client device 104 may utilize the one or more UIs 110 and the one or more APIs 108 throughout the interaction with the server 102. For example, a UI of the one or more UIs 110 may be a web browser or UI of a client application that may be used to access Internet services. The client device 104 may be configured to communicate data to the server 102, by use of the assigned numeric values, each of which corresponds to a registered metric. Such communicated data, as described below, may enable the server 102 to remotely monitor the performance of the one or more APIs 108 and the one or more UIs 110, associated with the client device 104. The usage of the numeric values may be advantageous as it a Bows increased storage of data on what would normally be limited client storage. Usage of the numeric values may also result in the transfer of less data to the server 102 that results in an optimized utilization of the network bandwidth.

In accordance with an embodiment, the client device 104 may be configured to detect a start time aid an end time of a session, based on an inflation of a user activity and/or inactivity for a pre-defined threshold time on the UI. The client device 104 may be configured to generate a new session identifier (ID) based on the detected start time and the end time of the session.

In accordance with an embodiment, the client device 104 may be configured to measure a latency value associated with performance of each of the one or more APIs 108 and/or each of the one or more UIs 110. The client device 104 may be configured to store the measured latency value(s) as numeric value(s) that correspond to the pre-registered metrics). The client device 104 may communicate a plurality of numeric values that includes the stored numeric value(s) to the server 102.

In accordance with an embodiment, the server 102 may be configured to receive the plurality of numeric values from the client device 104. Each of the received plurality of numeric values may correspond to a registered metric of the one or more registered metrics. The server 102 may mark a particular session as "closed" if no data is received within the pre-defined threshold time, such as last "30 minutes". The received plurality of numeric values may correspond to a transport protocol version, a type of data packet, a session identifier (ID), a session sequence number, a timestamp of a first metric, an application build version value, a client device ID, a current metric numeric value, a previous metric numeric value, a latency value, and/or a time offset value from the timestamp of the first metric, as shown in the Table 4 of FIG. 4.

In accordance with an embodiment, the server 102 may be configured to determine a missing sequence value associated with receipt of data for a session from the Client device 104. The missing sequence value may be determined based on the received plurality of numeric values for a plurality of sessions. The missing sequence value may correspond to a deviation from a pre-specified sequence for the receipt of the data foe each session of the plurality of sessions. For example, out of a total ten sessions performed at the client device 104, session IDs may be expected to be received in sequence, such as from zero to ten in an increasing order. For instance, session data that corresponds to the plurality of numeric values of one or two sessions, such as a third session and a fourth session, may not be received. Thus, at a time instance when session data for a fifth session is received, session data for the third session and fourth session may be the determined to be missing sequences. There may be a plurality of client devices torn which session data may be received. Thus, for each client device ID and the session ID combination, the server 102 may store last received time and the determined missing sequence values in the memory 204. The determined missing sequence values may be used as a quality indicator for data received from the client device 104.

In accordance with an embodiment the server 102 may be configured to determine a latency of a first load of the registered metric in the client device 104, in a session based on a plurality of numeric values received from the client device 104. For example, the first user 112 navigates multiple times to a functional region, such as "WhatsNew" node or link, of a UI. It may be of interest to know the first time latency or initial load time, as subsequent load time may be affected by a local cache at the client device 104. The sever 102 may be configured to determine an average latency of a first load of each registered metric of the plurality of registered metrics, in the client device 104 per session. Such determination may be based on session data for the client device 104 received as the plurality of numeric values.

In accordance with an embodiment, the server 102 may be configured to determine a count related to number of times each UI of the one or more UIs 110 is accessed per session. For instance, it may be of interest to find how many times a UI (such as a web page) is accessed per session. In accordance with an embodiment, the server 102 may be configured to generate a visualization of a navigation flow between one or more UIs 110 in the session. Further, a source of traffic to a specific UI of the one or more UIs 110 may be identified.

In accordance with an embodiment the server 102 may be configured to determine a latency of an API when the client device 104 invokes a plurality of serial calls to the plurality of APIs. The plurality of APIs may correspond to the one or owe APIs 108. For instance, the client device 104 may invoke serial calls to mom than one APIs, and it may be of interest to determine and visualize latency of individual APIs and aggregation of ail the APIs in a group that corresponds to the navigation flow.

In accordance with an embodiment, the server 102 may be configured to identify a specific API that exhibits a higher latency in comparison to other APIs when the client device 104 invokes a plurality of parallel calls to the plurality of APIs. The identification and determination of the latency may be based on the plurality of numeric values received from the client device 104. For instance, the client device 104 may invoke parallel calls to more than one APIs, and it may be of interest to determine and visualize which API may require a longer time to respond.

In accordance with an embodiment the sewer 102 may be configured to determine time spent on each element of a navigation flow in a session based on the received plurality of numeric values. In accordance with an embodiment, the server 102 may be configured to determine a total time spent on a plurality of elements of the navigation flow in the session.

In accordance with an embodiment, the sewer 102 may be configured to determine a collective metric associated with a plurality of client devices. The collective metric may be determined based on an aggregation and/or filtering of the received plurality of numeric values from the client device 104 and other plurality of numeric values received from other client devices (now shown) of the plurality of client devices.

In accordance with an embodiment, the sewer 102 may be configured to dynamically generate one or more reports related to the performance of the one or more APIs 108 and/or the one or more UIs 110. The one or more reports may be generated based on a conversion of the plurality of numeric values received from the client device 104 to the plurality of registered metrics. Such conversion may be performed by use of the unique namespace information that corresponds to each registered metric.

For the sake of brevity, one client device of the one or more client devices, such as the client device 104, is shown in the FIG. 1. However, without departure from the scope of the disclosed embodiments, there may be a plurality of client devices that may communicate with the server 102. The plurality of client devices may be located at certain geographical areas or may be distributed in different geographical locations.

Figure 2A:
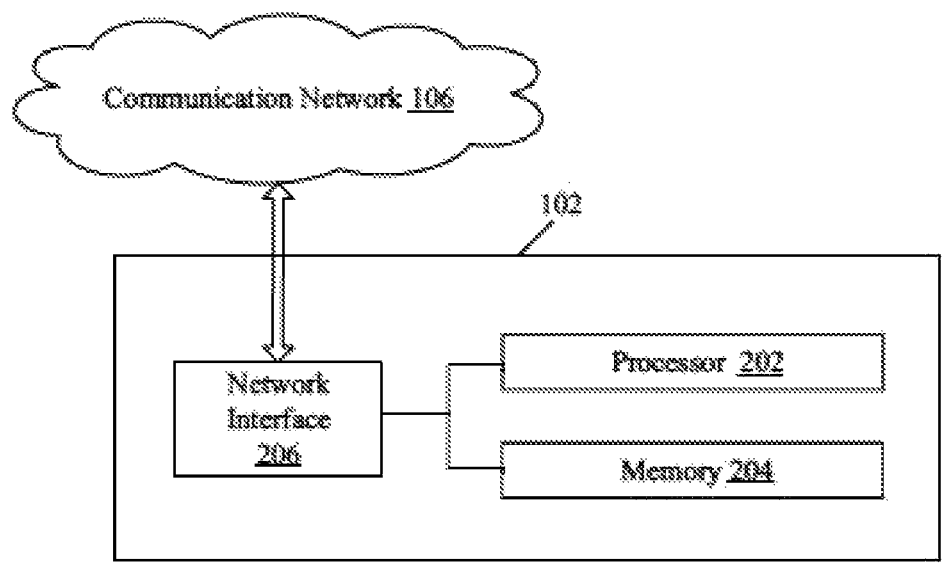
FIG. 2A illustrates a block diagram of an exemplary server to remotely monitor API performance and user behavior associated with a UI, in accordance with an embodiment of the disclosure.

FIG. 2A illustrates a block diagram of an exemplary sewer to remotely monitor API performance and user behavior associated with a UI, in accordance with an embodiment of the disclosure. FIG. 2A is explained in conjunction with elements from FIG. 1. With reference to FIG. 2A, there is shown the sewer 102. The server 102 may comprise one or more processors, such as a processor 202, a memory 204, and a network interface 206. The processor 202 may be communicatively coupled to the memory 204, and the network interface 206. The network interface 206 may communicate with one or more client devices, such as the client device 104, via the communication network 106 under the control of the processor 202.

The processor 202 may comprise suitable logic, circuitry, interfaces, and/or code that may be configured to execute a set of instructions stored in the memory 204. The processor 202 may be implemented based on a number of processor technologies known in the art Examples of the processor 202 may be an X86-based processor, X86-64-based processor, a Reduced Instruction Set Computing (RISC) processor, an Application-Specific Integrated Circuit (ASIC) processor, a Complex instruction Set Computing (CISC) processor, a central processing tail (CPU), an Explicitly Parallel Instruction Computing (EPIC) processor, a Very Long Instruction Word (VUW) processor, and/or other processors or circuits.

The memory 204 may compose suitable logic, circuitry, and/or interfaces that may be configured to store a machine code and/or a set of instructions executable by the processor 202. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, interfaces, and/or code that may be configured to communicate with one or more client devices, such as the client device 104, via the communication network 106 (as shown in FIG. 1). The network interface 206 may implement known technologies to support wired or wireless communication of the server 102 with the communication network 106. The network interface 206 may include, but is not limited to, an antenna, a radio frequency (RF) transceiver, one or more amplifiers, a tuner, one or more (c) senators, a digital signal processor, a coder-decoder (CODEC) chipset, a subscriber identity module (SIM) card, and/or a local buffer. The network interface 206 may communicate via wired or wireless communication with the communication network 106. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Long-Term Evolution (LTE), Wireless Fidelity (Wi-Fi) (such as IEEE 802.11a, IEEE 802.11b, IEEE 802.11g and/or IEEE 802.11n), voice over Internet Protocol (VoIPX Wi-MAX, a protocol for email, instant messaging, and/or Short Message Service (SMS).

In operation, the processor 202 may be configured to register a metric associated with performance of the one or more APIs 108 and the one or more UIs 110, associated with the client device 104, as a unique namespace information. The unique namespace information may correspond to a unique namespace string, such as a character string, and/or a unique namespace information value. The uniqueness of the namespace information may be enforced and checked at the time of registration.

At the time of registration of the metric, the metric may be defined by a unique namespace string, a metric ID, and one or more attributes, such as 2 attributes. The one or more attributes may correspond to a serial metric (denoted as "S") and a parallel metric (denoted as "P"); an API metric (denoted as "api") and a user metric (denoted as "user"); an impression court and a session count; and one or more attributes for aggregation type.

In accordance with an embodiment in a metric aggregation data model serial metrics may have mutually exclusive timing in a "Feature.Flow.Segment" data model. "Feature" may be a functional group of flows. For example, "RegiCam Flow" may be a name for a group of segments. For example "RegiCam.NewUser"."Segment" may be a name for a specific functional region of an UI of the me or more UIs 110. For example "RegiCam.NewUser.GetStarted". Serial metrics may be aggregated to a total time, whereas parallel metrics may not be expressed as a total tone.

In accordance with an embodiment, in a metric data model, API metrics may be used to determine API performance of an application (such as a software application) at the client device 104 or other client devices of the plurality of client devices. User metrics may be used to determine user behavior. In accordance with an embodiment, in a data aggregation period, impression counts may be increased each time a "Feature. Flow. Segment" is impressed (occurrence of an impression) in a session. Session counts may be increased once for each visit in a single session.

In accordance with an embodiment the one or more attributes for aggregation-type metrics may define how the data is aggregated from the client device 104, or others of the plurality of client devices across various impressions or sessions. Examples of the aggregation-type metrics may be sum, count, average, quartile, and/or $95^{th}$ percentile. In accordance with an embodiment a user-defined namespace string may be used as the ID of a metric from the user's perspective. A namespace string may be a defined as "Namespace_String=<Feature>.<Flow>.<Segment>.<Metric>".

In accordance with an embodiment, the processor 202 may be configured to assign a unique numeric value to each of the one or more registered metrics. The numeric value may be assigned to associate the numeric value with a corresponding registered metric of the one or more registered metrics. For example, a user, such as the second user 114 may enter a namespace string along with two attributes of the metric in a namespace management system of the server 102. The namespace management system may dynamically assign the metric with a numeric identifier (ID), such as an integer ID. For example, a new metric "RegiCam.NewUser.GetStarted" may be mapped to a numeric value of "12". Thus, the numeric value may also be referred to as a metric ID as it exemplifies a particular registered metric.

In accordance with an embodiment, the processor 202 may be configured to synchronize the assigned numeric value associated with the registered metric at the client device 104 and the server 102. In other words, each metric may be mapped to a numeric value. Accordingly, a relationship may be established between the assigned numeric value and a literal name of the registered metric, on both the client device 104 and the server 102. In accordance with an embodiment the processor 202 may be configured to generate reports associated with performance of the one or more APIs 108 and/or the one or more UIs associated with the client device 104, based on receipt of the assigned numeric value(s) from the client device 104. For a metric to be included in the report the metric needs to be registered with the namespace management system of the server 102 or the http web server 304 (as shown in FIG. 3).

In accordance with an embodiment, a namespace report string may be used by a reporter, such as the second user 114, to generate a desired report. For example, the namespace report string may be a defined as:

"Namespace_Report_String = <Namespace_String>.<Control_String>", where "Control_String = (S|P).(user|api).(Session|Lifetime).<Operation>".

In accordance with an embodiment the implementation of the disclosed system and method may occur in centralized computing environment (as shown in FIG. 1) or in a distributed computing environment (as shown in FIG. 3). Accordingly, the operations performed by the processor 202 of the sewer 102 may be distributed based on a network architecture, as described by an example in the FIG. 3.

Figure 2B:
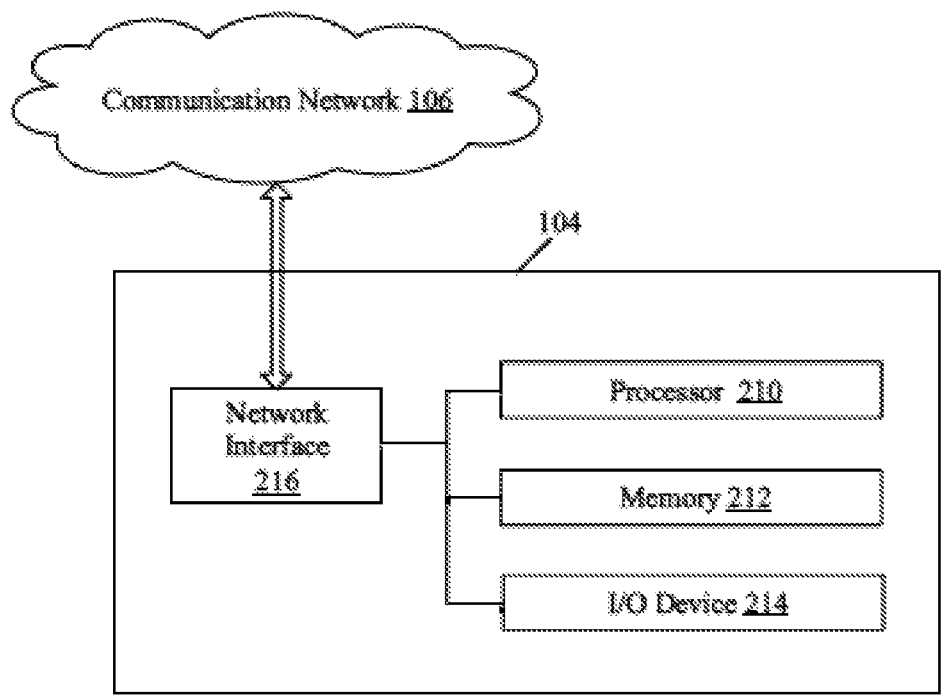
FIG. 2B illustrates a block diagram of an exemplary client device to monitor API performance and user behavior associated with a UI, in accordance with an embodiment of the disclosure.

FIG. 2B illustrates a block diagram of an exemplary client device to monitor API performance aid user behavior associated with a UI, in accordance with an embodiment of the disclosure. FIG. 2B is explained in conjunction with elements from FIGS. 1 and 2A. With reference to FIG. 2B, there is shown the client device 104. The client device 104 may comprise one or more processors, such as a processor 210, a memory 212S one or more input/output (I/O) device, such as an I/O device 214, and a network interface 216. The processor 210 may be communicatively coupled to the memory 212, the I/O device 214, and the network interface 216. The network interface 216 may communicate with one or more sewers, such as the sewer 102, via the communication network 106 under the control of the processor 210.

The processor 210 may comprise suitable logic, circuitry, interfaces, and/or code that may be configured to execute a set of instructions stored in the memory 204. The processor 210 may be configured to determine a session, based on an initiation of a user activity and/or inactivity on at least one of the one or more UIs 110 for a pre-defined threshold time. Examples of the processor 210 may be similar to that of the processor 202 (as described in FIG. 2A).

The memory 212 may comprise suitable logic, circuitry, and/or interlaces that may be configured to store a machine code and/or a set of instructions executable by the processor 210. In accordance with an embodiment, the memory 212 may correspond to a client data store or persistent storage. In accordance with an embodiment, the memory 212 may be Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 214 may comprise suitable logic, circuitry, interfaces, and/or code that may be operable to receive an input from the first user 112. The I/O device 214 may be further operable to provide an output to the first user 112. The I/O device 214 may comprise various input and output devices that may be operable to communicate with the processor 210. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a display screen, and/or a speaker.

The network interface 216 may comprise suitable logic, circuitry, interfaces, and/or code that may be configured to communicate with one or more servers, such as the server 102, via the communication network 106 (as shown in FIG. 1). The network interface 216 may implement known technologies to support wired or wireless communication of the client device 104 with the communication network 106. The network interface 216 may communicate via wired or wireless communication with the communication network 106, similar to that as described in FIG. 2A.

In operation, the processor 210 may utilize the one or more UIs 110 and the one or more APIs 108 throughout the interaction with the server 102. For example, a UI of the one or more UIs 110 may be a web browser used to access Internet services, or UI of a client application. A client library (shown and described in FIGS. 3 and 4) may run on the client device 104.

In accordance with an embodiment, the processor 210 may be configured to detect a start time and an end time of a session. The processor 210 may be configured to generate a new session ID based on the detected start time and the end time of the session. For example, in instances when the processor 210 detects that a user, such as the first user 112, is inactive for the pre-defined threshold time, such as for last "30 minutes", the processor 210 may generate the new session ID. The processor 210 may be configured to determine the session based on the initiation of the user activity and/or inactivity, as described above. It may be very difficult to detect session boundaries from the server, such as at the server 102, due to stateless HTTP requests. This, the determination of one or more sessions at the client device 104 may be more accurate than at the server 102. In certain scenarios, when the UI (such as a browser) is closed, or at an event of logout from the UI, the session may be marked as complete, and the new session ID may be generated.

In accordance with an embodiment, the processor 210 may be configured to measure a latency value associated with performance of each of the one or more APIs 108 and/or each of the one or more UIs 110. The processor 210 may be configured to store the measured latency value(s) as numeric value(s) in the memory 212, such as a persistent client storage, that correspond to the pre-registered metric(s). The processor 210 may communicate a plurality of numeric values that includes the stored numeric value(s) to the server 102, by use of the network interface 216. The operations performed by the processor 210 may be further understood as described below, such as in the FIGS. 3 to 5, 6A, 6B, 7, and 9.

FIG. 3 illustrates an exemplary implementation of the disclosed system and method in a distributed computing environment to remotely monitor API performance and user behavior associated with a UI, in accordance with an embodiment of the disclosure. FIG. 3 is explained in conjunction with FIGS. 1, 2A, and 2B. With reference to FIG. 3, there is shown a network architecture 300. The network architecture 300 may include a client library 302 in the client device 104 at a client side. At a server side, the network architecture 300 includes an HTTP web server 304, a first message queuing sub-system 306, a data processing sub-system 308, a second message queuing sub-system 310, a data warehouse sub-system 312, historical reports 314, near real-time reports 316, and a metric hydration service 318. The HTTP web server 304 may include a log trailer application 304*a*. There is further shown a plurality of functional services 320 provided by the data processing sub-system 308 and the communication network 106. The client device 104 may be communicatively coupled to the HTTP web server 304.

The client library 302 may comprise suitable logic and/or code that may correspond to a set of instructions executable at the client device 104. The client library 302 may be used to measure the latency of the one or more APIs 108 or the registered metrics associated with the one or more UIs 110. The client library 302 may be further used by the client device 104 to communicate measured data to the HTTP web server 304. In accordance with an embodiment, the measured data may be communicated in binary form by use of the "HTTP POST" method, known in the art. The client library 302 may also be employed to create a unique session ID and to manage the monotonically increasing sequence number of a plurality of sessions at the client device 104.

The HTTP web server 304 may comprise suitable logic, circuitry, interfaces, and/or code that may be configured to receive data from the client device 104. In accordance with an embodiment, the HTTP web server 304 may receive the data as "HTTP POST" requests from the client device 104. In accordance with an embodiment, the HTTP web server 304 may be configured to transmit the received data to a local log file without processing the received data. The HTTP web server 304 may allow the received data to be communicated as the log file by use of one or more modules. This may allow an application server to be skipped, and thereby avoid overload or sluggishness of the application server when various requests are received at the same time from a plurality of client devices.

In accordance with an embodiment, the HTTP web server 304 may include the log trailer application 304*a* to communicate the received data as the log file to the first message queuing sub-system 306. The HTTP web server 304 may be configured to communicate the log file at a pre-defined time interval. For instance, the log file may be communicated every hour to the first message queuing sub-system 306. In accordance with an embodiment, a plurality of web servers may be employed. The traffic may be balanced in such plurality of web servers by use of a load balancer, such as by use of Elastic Load Balancing (ELB) technique associated with a web service.

The log trailer application 304*a* in the http web server 304 may be configured to queue or tail the log file and relevant data info the first message queuing sub-system 306. The http web server 304 may include a checkpoint support feature that may allow restart without data loss. The checkpoint support feature further makes replay from a checkpoint possible to support redo scenarios. The checkpoint support feature may be supported and/or effectuated by the log trailer application 304*a*.

In accordance with an embodiment, one or more performance indicators and corresponding alarm indicators may be pre-configured at the http web server 304. The one or more performance indicators and alarm indicators may indicate the performance of the http web server 304, as represented in the Table 1 given below.

TABLE 1

Performance of http web server 304.

| Performance Indicators | Alarm indicators |
| --- | --- |
| CPU utilization of each instance | When utilization of each instance greater than a first pre-defined threshold, such as 80% for 5 minutes, detected |
| Number of successful HTTP requests at ELB | Based on tracked actual traffic |
| Number of 3xx, 4xx and 5xx HTTP requests at ELB | When requests greater than 0 detected |
| Average latency at ELB | When latency greater than a second pre-defined threshold, such as 0.05 for 3 minutes |
| Log trailer application 304a performance indicator | When no data or insufficient data detected for a preset time |
| Number of data lines processed by the log trailer application 304a | When number of data lines is equal to 0 for a pre-defined threshold time, such as one minute |

The first message queuing sub-system 306 may be configured to receive the log file from the http web server 304. The first message queuing sub-system 306 may have a separate topic (or field) for each device type associated with the one or more client devices, such as the client device 104. In accordance with an embodiment, the first message queuing sub-system 306 may include two types of topics, such as raw and aggregated.

An example of the topic type and the corresponding topic format as shown below in the Table 2. The term "clairvoyance" may refer to an Internet service that corresponds to the plurality of functional services 320 provided by the data processing sub-system 308.

TABLE 2

| Topic Type | Topic Format |
| --- | --- |
| Raw | Clairvoyance_<deviceType> |
| Aggregated | ClairvoyanceAggregated_<deviceType> |

The data processing sub-system 308 may be configured to aggregate received data in the distributed environment. The data processing sub-system 308 may be further configured to aggregate received data in a memory during a session. The received data may be aggregated by use of the plurality of functional services 320. The persistence (input) of the aggregated data into a database, such as the data warehouse sub-system 312, when the session is expired may reduce the amount of data stored in the data warehouse sub-system 312. The mechanism of session-wise persistence of the aggregated data may enable accurate computation of the registered collective metric associated with the plurality of client devices. For instance, performance indicators, such as $95^{th}$ percentile, average, quartiles, and latency Pareto charts, indicate performance of a specific API or performance of the one or more APIs 108 in combination for ail the connected client devices of the plurality of client devices. Examples of the data processing sub-system 308 may include, but are not limited to, an Apache© Spark cluster or other duster-computing device.

In the data processing sub-system 308, the client device ID and the session ID combination may be stored in the memory until the session is expired. The session may be considered as expired at the data processing sub-system 308 when data from the client device 104 is not received for a pre-defined time period, such as, "for last 30 minutes". For each session, all the counters are aggregated in the local memory, and persisted into the database, such as the data warehouse sub-system 312, once the session is expired.

The second message queuing sub-system 310 may be configured to receive the processed data from the data processing sub-system 308. The processed data may be queued in the second message queuing sub-system 310. In accordance with an embodiment, the second message queuing sub-system 310 may not be provided. In such a case, the processed data may be queued back in the first message queuing sub-system 306.

The data warehouse sub-system 312 may be configured to store the processed data received from the second message queuing sub-system 310. The data warehouse sub-system 312 may be used to generate the historical reports 314 associated with one or more client devices, such as the client device 104. Examples of the data warehouse sub-system 312 may include, but are not limited to a, a Redshift data warehouse, a cloud-based warehouse, and/or other databases or data warehouses, known in the art.

The historical reports 314 may correspond to the one or more reports generated based on historical data stored at a database, such as the data warehouse sub-system 312. The historical reports 314 may enable a user, such as the second user 114, to perform temporal analysis of metrics associated with the performance of the one or more APIs 108. Further, the historical reports 314 may make it possible for temporal analysis of metrics associated with the performance and/or user behavior related to use of one or more UIs 110.

The near real-time reports 316 correspond to the one or more reports generated for real-time or near real-time monitoring of the metrics associated with performance of the one or more APIs 108 and the one or more UIs 110. In accordance with an embodiment, the near real-time reports 316 may be generated by use of data retrieved from the second message queuing sub-system 310. The near real-time reports 316 and/or the historical reports 314 may be used by the second user 114, such as an engineering resource, to prioritize developmental efforts for certain APIs or UI elements that exhibit higher latency and may be critical for provision of enhanced user experience to the first user 112, such as a consumer.

The metric hydration service 318 may refer to a functionality associated with identification of me one or more registered metrics from me assigned numeric values, and vice-versa. At the time of generation of the near real-time reports 316 and the historical reports 314, the metric hydration service 318 may be employed to convert the received numeric values to corresponding metrics, by use of the unique namespace information.

The plurality of functional services 320 may refer to logic, code, or functionalities associated with processing of data at the data processing sub-system 308. The processing of data may occur to remotely monitor performance of the one or more APIs 108 and/or user behavior associated with the one or more UIs 110. The operations performed by the client device 104 at the client side, and the server 102 or a group of servers at the server side as shown in FIG. 3, may be further understood as described below, such as in FIGS. 4, 5, 6A, 6B, 7, 8, and 9.

Figure 4:
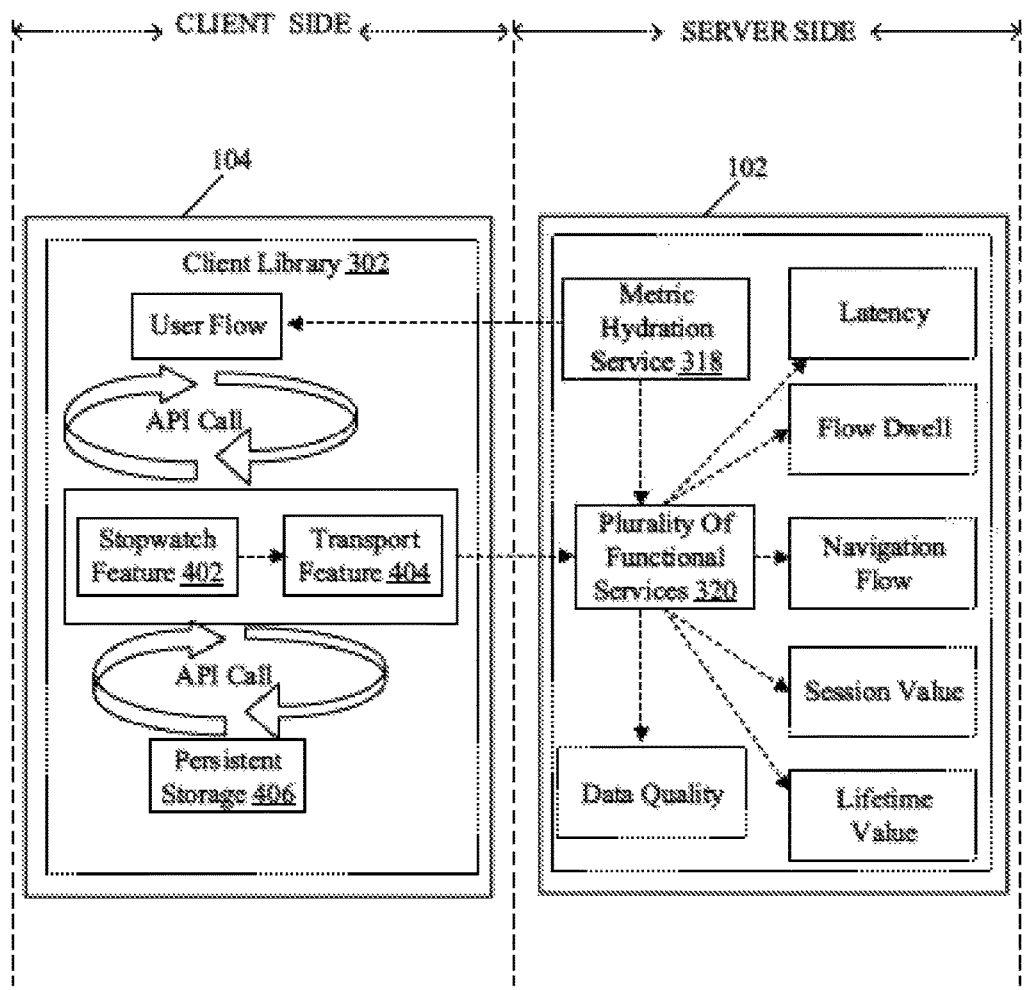
FIG. 4 illustrates an overview of the functionalities of an exemplary client device for implementation of the disclosed system and method to remotely monitor API performance and user behavior associated with a UI, in accordance with an embodiment of the disclosure.

FIG. 4 illustrates an overview of the functionalities of an exemplary client device and server for implementation of me disclosed system and method to remotely monitor API performance and user behavior associated with a UI, in accordance with an embodiment of the disclosure. FIG. 4 is explained in conjunction with FIGS. 1,2, and 3. With reference to FIG. 4, there is shown a stopwatch feature 402, a transport feature 404 of the client library 302, and a persistent storage 406 provisioned at the client device 104. There is further shown the plurality of functional services 320 and the metric hydration service 318 provisioned at the server 102 or a group of servers in the network architecture 300, as shown in FIG. 3.

The stopwatch feature 402 may be a part of the client library 302. The client library 302 (as described in FIG. 3) may further provide multiple APIs to determine the start time and the end time of metric in a session by use of the stopwatch feature 402. The client library 302 may further provide certain other APIs to transmit data to the server 102 (FIG. 1) or the http web server 304 (FIG. 3) by use of the transport feature 404. Such APIs may be a part of the one or more APIs 108 of the client device 104, as shown in an example in the Table 3.

TABLE 3

| API | DESCRIPTION |
| --- | --- |
| Functional_Service.start(metric) | Starts the stopwatch feature 402 for a metric, and passed as a numeric value pre-defined at the build time of the client service, such as a "client build" service |
| Functional_Service.stop(metric) | Stops the stopwatch feature 402 for the metric and sends-data to the server 102 or the http web server 304 |
| Functional_Service.sendLatencyData(obj) | Sends latency timing for multiple metrics to the server 102 or the http web server 304 |

In accordance with an embodiment, the client library 302 may require certain values for initialization, such as a unique client device ID, a Uniform Resource Locator (URL), an application build version value, a code-based object (such as a JavaScript object) associated with a client data store of the client device 104. The client data store may correspond to the persistent storage 406 of the client device 104. The client data store may perform abstraction of persistence mechanisms of the client device 104 from the client library 302. The abstraction of the persistence mechanisms may enable same operation to be performed across the plurality of client devices that store data differently. For example, when the client device 104 is a gaming device, the persistence store may be custom persistence store. In such a case, when the one or more UIs 110 of the client device 104 is a web browser, the persistence store may be a cookie stored at the memory 212.

An exemplary code employed to depict initialization of the client library 302 at the client device 104 is given below.
[Initialize Client Library:

varFunctional_Service = new Functional_Service ("some_device_id", 2, dataStoreObject, "Http://host:port/Functional_Service/deviceType");

Start Stopwatch Feature 402 to Measure Latency:
    Functional_Service.start (5);
Stop Stopwatch and Send Measurements to Functional_Service:
    Functional_Service.stop (5);
Send Latency Timing for Multiple Metrics:

Functional_Service. sendLatencyData ([{"metric": 5, "startTimestamp": 1425074929110, "latency" : 103}, {"metric": 7, "startTimestamp" : 1425074929120, "latency" : 95}]);]

In the above exemplary example, the numeric values "5" and HT correspond to the registered metric for which start time and end time are measured. As given above, other data, such as measured start time and end time and the latency values, are also stored at the persistent storage 406 as numeric values. Similarly, the client device 104 may be configured to measure a latency value associated with performance of each of the one or more APIs and/or each of the one or more UIs 110. The client device 104 may be configured to store the measured latency value(s) as numeric value(s) that corresponds to the pre-registered metrics). The client device 104 may communicate a plurality of numeric values that includes the stored numeric value(s) at the persistent storage 406 to the server 102.

In accordance with an embodiment, the client data store may support one or more methods or functions to save session-related data associated with the client device 104. Examples of the one or more methods or functions may include, but are not limited to, "saveSessionString(string)" and "getSessionString( )". The client device 104 may utilize the one or more methods or functions to store certain session-related values, such as a last update timestamp, the session 10, a session sequence value, and a numeric value of last measured metric. For example, the timestamp may be in seconds or milliseconds, or other known time format. The session ID may be a 64-bit random number. The session sequence value may start with "0", and may increase monotonically for every session. Thus, the client device 104 may determine one or more sessions at the client device 104 itself, as described in FIG. 1.

The processor 210 (of the client device 104) may be configured to communicate data as numeric values, each of which is associated with the corresponding registered metric, to the server 102, by use of the network interface 216. Such communicated data as the numeric values, may enable the server 102 to remotely monitor the performance of the one or more APIs 108 and the one or more UIs 110, associated with the client device 104. The usage of the numeric values may be advantageous as it allows to store more data on a limited client storage, such as the persistent storage 406, aid transfer less data to the server 102.

The transport feature 404 may package the data, such as the plurality of numeric values, which includes the stored numeric value(s) at the persistent storage 406. The data may be packaged in a certain format to be communicated to the server 102 (FIG. 1) or the http web server 304, via the communication network 106. An example of the transport protocol that may be employed by the client device 104 is given below in the Table 4.

TABLE 4

Transport Protocol

| Length | | Description |
|---|---|---|
| 1 byte | | Protocol version |
| 1 byte | | Packet Type |
| 8 bytes | | Session ID |
| 4 bytes | | Sequence number |
| 8 bytes | | Timestamp of first metric |
| 2 byte | | Build version integer |
| 4 bytes | | Length of device ID string in bytes |
| Variable Run length encoded | | Device ID |
| 16 bytes | 4 bytes | Metric integer |
| for each | 4 bytes | Previous Metric integer |
| metric | 4 bytes | Latency in milliseconds |
| (repeating) | 4 bytes | Offset in milliseconds from timestamp of first metric |

In accordance with an embodiment, the processor 210 may be configured to measure a latency of a first load of each registered metric in a session by use of the one or more APIs 108. For example, time taken for mitral load of a webpage when cache for the webpage is not present in the persistent storage 406. The processor 210 may invoke serial calls to a plurality of APIs, such as to me one or more APIs 108, and store assigned different numeric value related to latency of each API recorded by the stopwatch feature 402. The processor 210 may further invoke parallel calls to the plurality of APIs. This may be done to identify an API that exhibits a higher latency in comparison to other APIs among the plurality of APIs. The stored numeric values may be communicated to the server 102, which may be used to understand metrics related to latency at the client device 104.

In accordance with an embodiment, the processor 202 (of the server 102) may be configured to generate reports by use of the metric hydration service 318, which converts the received numeric values to corresponding metrics by use of the unique namespace information. The report may be used by the second user 114, such as an engineering resource, to prioritize developmental efforts for certain APIs that exhibit higher latency and may be critical.

In accordance with an embodiment, the client device 104 may store assigned numeric values related to a visit (or access) of the first user 112 to a particular UI or a function region of am UI of the one or more UIs 110 per session. The client device 104 may store assigned numeric values related to time spent on each element of a navigation flow in a session by use of the stopwatch feature 402. The stored numeric values may be communicated to the server 102, which may be used to understand metrics related to flow dwell at the client device 104 in a session. In accordance with an embodiment, metrics from multiple functional regions (such as segments) may not be sent together and metrics for each functional region (segment) may be sent to the server 102 in order of navigation.

In accordance with an embodiment, the processor 202 may be configured to generate reports by use of the metric hydration service 318, as described above. The report may be used by the second user 114, such as an engineering resource, to understand the user behavior, such as user behavior of the first user 112, in a session. Similarly, the processor 202 may be configured to generate reports for a plurality of client devices that may access the same one or more UIs 110, such as a website, or an application UI. Accordingly, design and update of certain UI elements may be prioritized to quickly and effectively enhance the user experience, and provide better user experience related to the navigation flow. As, the device ID and the session ID combination key is stored in the memory 204 until a session is expired, counters may be aggregated for the plurality of client devices by use of an aggregation memory model, as shown in FIG. 5.

Figure 5:
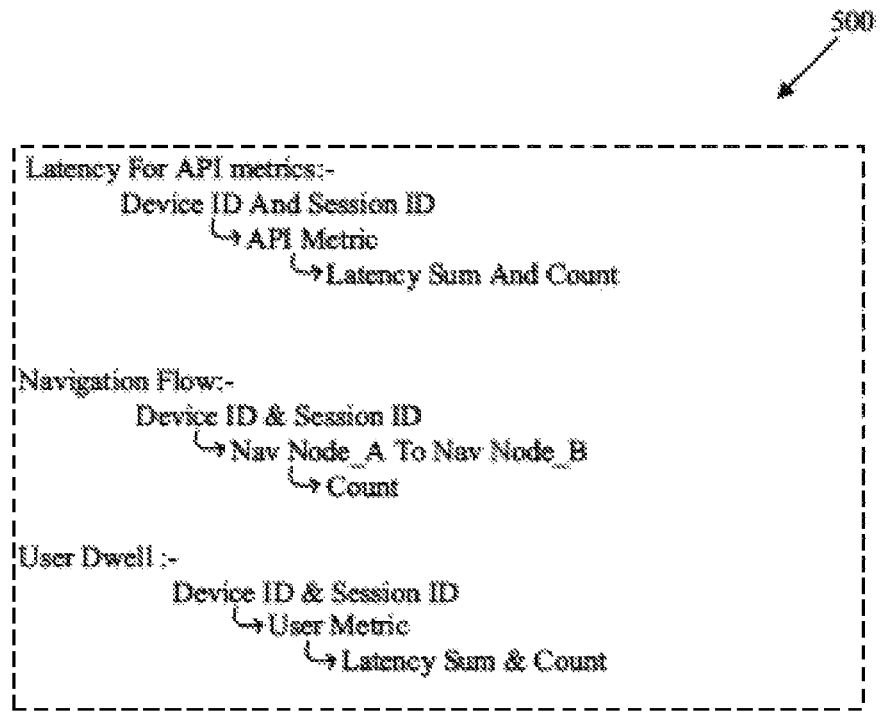
FIG. 5 illustrates an exemplary aggregation memory model at a server for implementation of the disclosed system and method to remotely monitor API performance and user behavior associated with a UI, in accordance with an embodiment of the disclosure.

FIG. 5 illustrates an exemplary aggregation memory model at server side, for implementation of the disclosed system and method to remotely monitor API performance and user behavior associated with a UI, in accordance with an embodiment of the disclosure. FIG. 5 is described in conjunction with FIGS. 1 to 4. With reference to FIG. 5, there is shown an aggregation memory model 500. The aggregation memory model 500 may be implemented in the server 102 (FIG. 1) or the data processing sub-system 308 (FIG. 3).

In accordance with an embodiment counters may be aggregated for the latency report for AH metrics, a navigation How report, and/or the user dwell report by use of the aggregation memory model 500, as shown. All open sessions for the plurality of devices may be checked at a pre-determined time threshold, such as every 60 seconds. The processor 202 may mark a particular session as "closed" if no data is received within another pre-defined threshold time, such as, "last 30 minutes" Counters related to closed sessions may be persisted into a database of the server 102.

In accordance with an embodiment, the processor 202 may be configured to determine a missing sequence value associated with receipt of data for a session from the network interface 216 of the client device 104. The missing sequence may be determined, based on me received plurality of numeric values for one or more other sessions of a plurality of sessions. For each client device ID and the session ID combination key, the processor 202 may store the last data received time and the determined missing sequence values in the memory 204. The determined missing sequence values may be used as a quality indicator for data received from the client device 104. The memory 204 may maintain two counters by use of a sliding windows mechanism, as given below in the Table 5. A first counter may store total requests (or session sequence) received from the client device 104 and a second counter may store the missing sequence values.

TABLE 5

A sliding windows mechanism to store missing sequence values.

| Data Receive Time | Sequence ID Received | Missing sequence values |
|---|---|---|
| T1 | 1 | |
| T2 | 3 | 2 |
| T3 | 2 | |
| T4 | 5 | 4 |

TABLE 5-continued

A sliding windows mechanism to store missing sequence values.

| Data Receive Time | Sequence ID Received | Missing sequence values |
|---|---|---|
| T5 | 7 | 4, 6 |
| T6 | 8 | 4, 6 |
| T7 | 9 | 4, 6 |
| T8 | 6 | 4 |

In accordance with an embodiment, the processor 202 may be configured to compute a percentage of missing sequence values with respect to a total count of the plurality of sessions for a user-defined time period. The computed percentage may be a quality indicator for data received from the client device 104. The processor 202 may generate an alert when the computed percentage is above a predefined threshold. A missing sequence value should not be counted multiple times, and the late receipt of sequence ID may be handed by the processor 202.

In accordance with an embodiment, the processor 202 may be configured to determine a collective metric associated with a plurality of client devices, by use of the client device ID and the session ID combination key. The collective metric may be determined based on an aggregation and/or filtering of the received plurality of numeric values from the client device 104 and other plurality of numeric values received from other client devices (now shown) of the plurality of client devices.

In accordance with an embodiment, various reports, such as the near real-time reports 316 or the historical reports 314, may be generated. The processor 202 may be configured to dynamically generate one or more reports related to the performance of the one or more APIs 108 anchor the one or more UIs 110. The one or more reports may be generated based on a conversion of the plurality of numeric values received from the client device 104, to the plurality of registered metrics by use of the metric hydration service 318. Such conversion may be performed by use of the unique namespace information that corresponds to each registered metric. For a metric to be included in the report, the metric needs to be registered with the namespace management system (of the server 102 (FIG. 1) or the http web server 304 (FIG. 3). An example of the types of reports is given below in the Table 6.

TABLE 6

Types of Reports

| Report | Description |
|---|---|
| Latency | Plot average latency of API metrics aggregated by user defined interval |
| Navigation Flow | Plot relative traffic between different views of the one or more UIs 110 (or pages) |
| User Dwell | Plot time spent while interacting with certain UI elements of the one or more UIs 110 |
| Session value | Count number of unique sessions, average length of sessions, metrics like "What'sNew" webpage views per session, latency due to API per session |
| Lifetime Value | Plot lifetime average latency of each registered metric |

In accordance with an embodiment, the data model for the latency may be represented in a table with the column fields, such as "DateTime", "Session_start_time", "Session_end_time", "Device_ID", "Session_ID", "Metric_ID", "Latency_Sum", "Count", "IP_Address", and/or "Device_Type" (from client library 302). In accordance with an embodiment, the data model for the navigation flow may be represented in a table with the column fields, such as "DateTime", "Session_start_time", "Session_end_time", "Device_ID", "Session_ID", "Previous_Nav", "Current_Nav", "Count", "IP_Address", "Device_Type", and/or "Build_version". The data model may be decoupled from the report model due to the use of the plurality of numeric values and the metric hydration service 318. The data model may also be decoupled with the transport format of the client data to the server 102 by use of the transport feature 404 at the client device 104, and the metric hydration service 318 at the server 102.

Figure 6A:
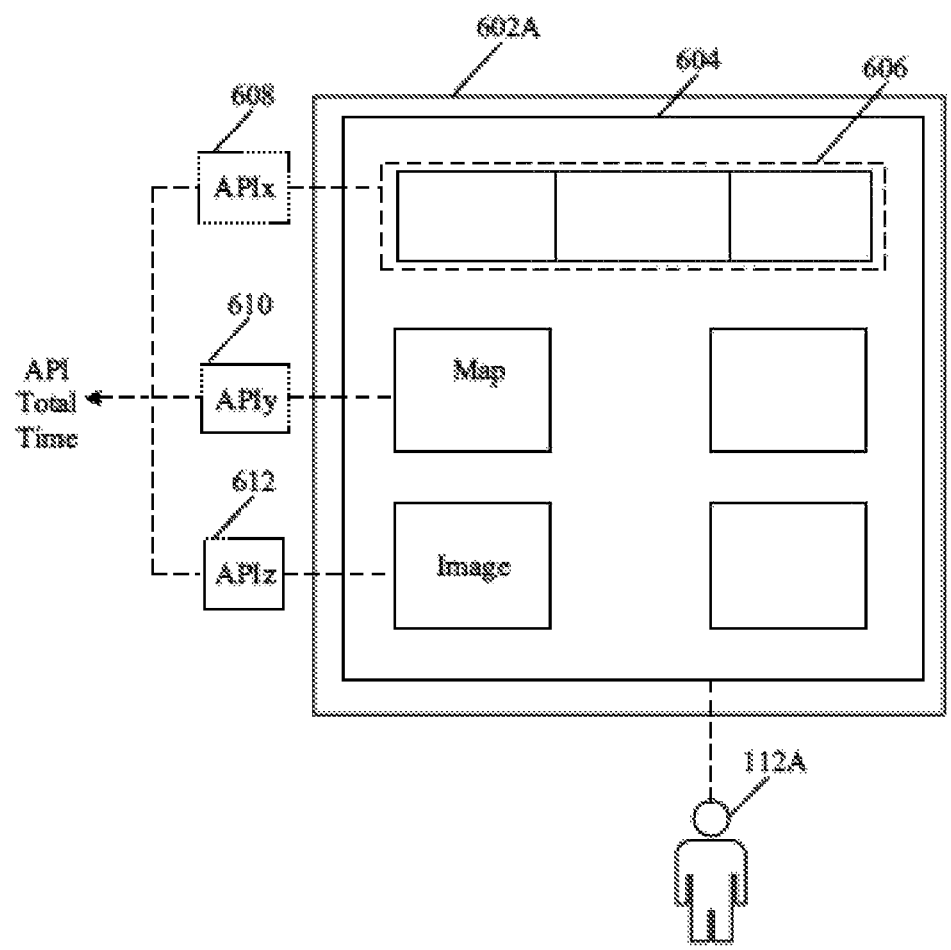
FIGS. 6A and 6B, collectively, illustrate a first exemplary scenario for implementation of the disclosed system and method to remotely monitor API performance and user behavior associated with a UI, in accordance with an embodiment of the disclosure.
Figure 6B:
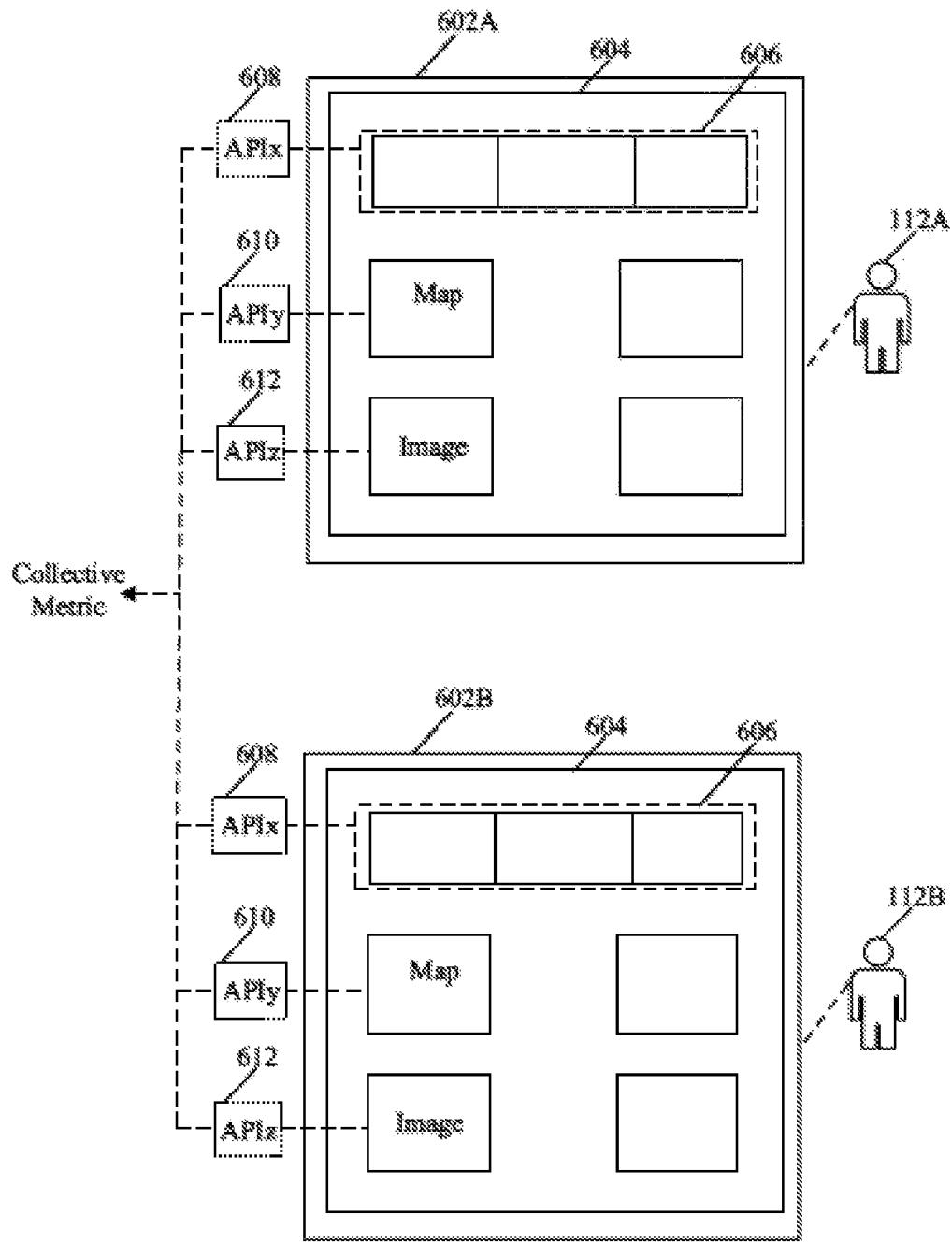

FIGS. 6A and 6B, collectively, illustrate a first exemplary scenario for implementation of the disclosed system and method to remotely monitor API performance and user behavior associated with a UI, in accordance with an embodiment of the disclosure. FIG. 6A is described in conjunction with FIGS. 1 to 5. With reference to FIG. 6A, there is shown a first client device 602A, a UI 604, a first tile 606, a first API 608, a second API 610, and a third API 612. There is further shown a first consumer 112A associated with the first client device 602A. The UI 604 may be a first webpage displayed at the first client device 602A.

In accordance with the first exemplary scenario, the first client device 602A may be similar to that of the client device 104. The UI 604 may correspond to the one or more UIs 110. The first API 608, the second API 610, and be third API 612 may correspond to the one or more APIs 108. The first API 608 may be associated with the display of the first tile 606 of the UI 604. The second API 610 may be associated with a function of a map service on the UI 604. The third API 612 may be associated with the display of another element, such as an image, on the UI 604.

In accordance with an embodiment, at the time of registration, the metric may be defined by a unique namespace string, a metric ID, and one or more attributes, such as at least 2 attributes. The registration may correspond to "client build" service employed for the first client device 602A. The one or more attributes may correspond to a serial metric (denoted as "S") and a parallel metric (denoted as "P"); an API metric (denoted as "api") and a user metric (denoted as "user"); an impression count aid a session count; and/or one or more attributes for aggregation type. A namespace string may be a defined as "WhatsNew.WhatsNew.Page1.firstTile". An example of the registered metric with attributes is given below in the Table 7.

TABLE 7

| Monotonically increasing | Report Metric String | | | Aggregation Data Model | |
|---|---|---|---|---|---|
| | | | | Series | API |
| Metric ID Metric Id | Feature | Flow | Segment | Metric Name | or Parallel | or User |
| 1 | WhatsNew | WhatsNew | Page1 | apiX | P | API |
| 2 | WhatsNew | WhatsNew | Page1 | firstTile | P | API |
| 3 | WhatsNew | WhatsNew | Page1 | firstTile | S | User |

In accordance with an embodiment, the processor 202 may be configured to assign a unique numeric value to each of the one or more registered metrics, such as the monotonically increasing metric ID, as given above in the Table 7. The namespace management system of the server 102 may dynamically assign the new metric with a numeric identifier (ID), such as "1" for the metric "WhatsNew.WhatsNew.Page1.firstTile.apix". Each metric may be mapped to a numeric value, such as the metric ID ("1", "2", or "3"), on both the first client device 602A and the server 102.

In accordance with an embodiment, the processor 202 may be configured to determine a latency of a first load of the first API 608, associated with the first tile 606, in me first client device 602A in a session based on a plurality of numeric values. For instance, the plurality of numeric values may be the assigned numeric value "1" for the identification of the registered metric, latency values, client device ID, and/or session ID, received from the first client device 602A. The performance of the first API 608 may be determined based on the received plurality of numeric values. Similarly, the processor 202 may be configured to determine a latency of a first load of the first tile 606 on the UI 604 at the first client device 602A, in the session based on the plurality of numeric values, such as the assigned numeric value "2" and the received other numeric values from the first client device 602A. The processor 202 may be configured to determine an average latency of a first load of each registered metric of the plurality of registered metrics, in the first client device 602A per session.

In accordance with an embodiment, the processor 202 may be configured to determine a count related to number of times the UI 604 is accessed per session. The processor 202 may be configured to identify that the second API 610 exhibits a higher latency in comparison to other APIs, such as the first AR 608 and the third AR 612, when the first client device 602A invokes a plurality of parallel calls to the APIs 608 to 612. The second user 114, such as an engineering resource, may then prioritize update of the second API 610 to quickly and effectively enhance the user experience.

With reference to FIG. 6B, there is shown a second client device 602B that may access an instance of the same webpage, such as the UI 604. There is further shown a second consumer 112B associated with the second client device 602B. FIG. 6B is explained in conjunction with FIGS. 1 to 5, and 6A.

In accordance with the first exemplary scenario, the second client device 602B may correspond to the client device 104. In accordance with an embodiment, the processor 202 may be configured to determine a collective metric associated with the first client device 602A and the second client device 602B, by use of the client device ID and the session ID combination key. The collective metric may be determined based on an aggregation and/or filtering of the received plurality of numeric values from the first client device 602A and the second client device 602B. For example, the average latency for the performance of the first API 608, at two different devices, such as the first client device 602A and the second client device 602B, may be computed. Similarly, the average latency associated with performance of all APIs or selective APIs, such as the second API 610 and the third API 612, across the plurality of dent devices, such as the first client device 602A and the second client device 602B, may be computed. The disclosed system makes the measurement of the API and user behavior related metrics possible in a uniform way across all client devices.

Figure 7:
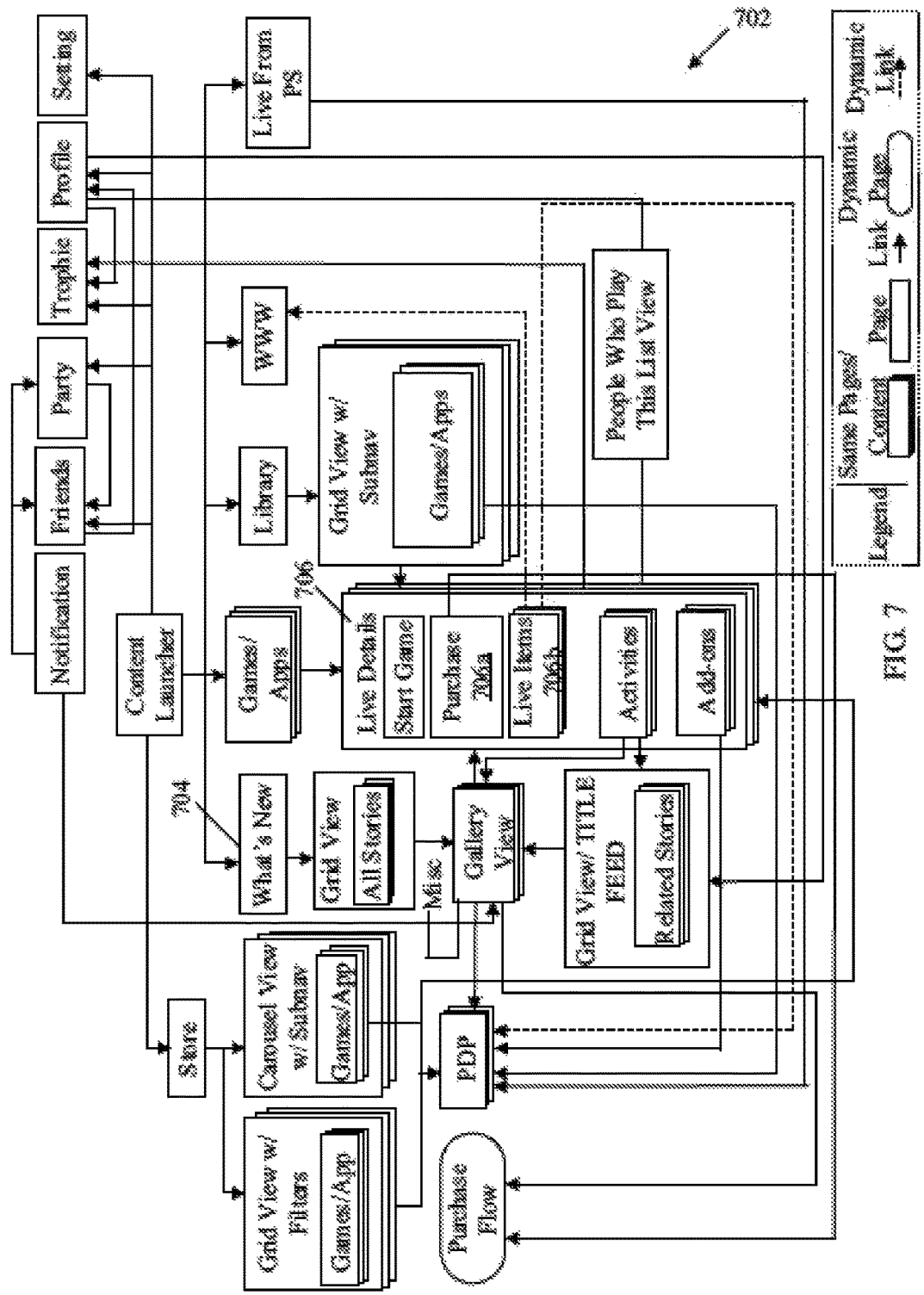
FIG. 7 illustrates a second exemplary scenario for implementation of the disclosed system and method to remotely monitor API performance and user behavior associated with a UI, in accordance with an embodiment of the disclosure.

FIG. 7 illustrates a second exemplary scenario for implementation of the disclosed system and method to remotely monitor API performance and user behavior associated with a UI, in accordance with an embodiment of the disclosure. FIG. 7 is explained in conjunction with FIGS. 1 to 5, 6A, and 6B. With reference to FIG. 7, there is shown a web application 702. The web application 702 may comprise a plurality of UIs and UI elements, such as a "what's new" region 704, a live details region 706, and a purchase region 706a in the live details region 706. The wet) application 702 may be cross-linked to other application UIs, as shown. The web application 702 may be a website accessed by the client device 104 or a software application pre-installed at the client device 104.

In accordance with the second exemplary scenario, the web application 702 may correspond to the one or more UIs 110. In accordance with an embodiment, the processor 202 may be configured to determine a count related to number of times each UI of the web application 702 is accessed per session. The processor 202 may be configured to generate a visualization of a navigation flow between different UIs of the web application 702. A source of traffic to a specific UI, such as the live details region 712, of the web application 702 may be identified based on the plurality of numeric values received from the client device 104. The processor 202 may be configured to generate a visualization of a navigation flow between different functional regions on the same or different UIs of the web application 702.

For instance, the first user 112 may first click on the "what's new" region 704, and then navigate in a certain order to the live details region 706, as shown in accordance with an embodiment, a "grid view" page may be loaded where various stories or content items are loaded in "gallery view" to allow selection of a live content item from the live items region 706b. The live content item may be a live broadcast of a game from another client device, such as the second client device 602B (FIG. 6B). In accordance with an embodiment, the processor 202 may be configured to determine time spent on each element, such as user dwell time on the live items region 706b, of the navigation flow in a session based on the received plurality of numeric values. In accordance with an embodiment, the server 102 may be configured to determine a total time spent on a plurality of UI elements or UIs of the navigation Row in the session. In instances when the "what's new" region 704 is non-functional or no content is displayed upon click on the "what's new" region 704, the critical problem may be easily identified, and solved to provide enhanced user experience.

In accordance with an embodiment a missing sequence associated with a navigation flow from a first UI to a target UI or functional region, such as the purchase region 704a, of the web application 702 may be determined. The missing sequence may correspond to a deviation from one or more pre-specified navigation flows. The determination of the missing sequence may be the basis to redesign a new navigation flow to enhance user experience.

Figure 8A:
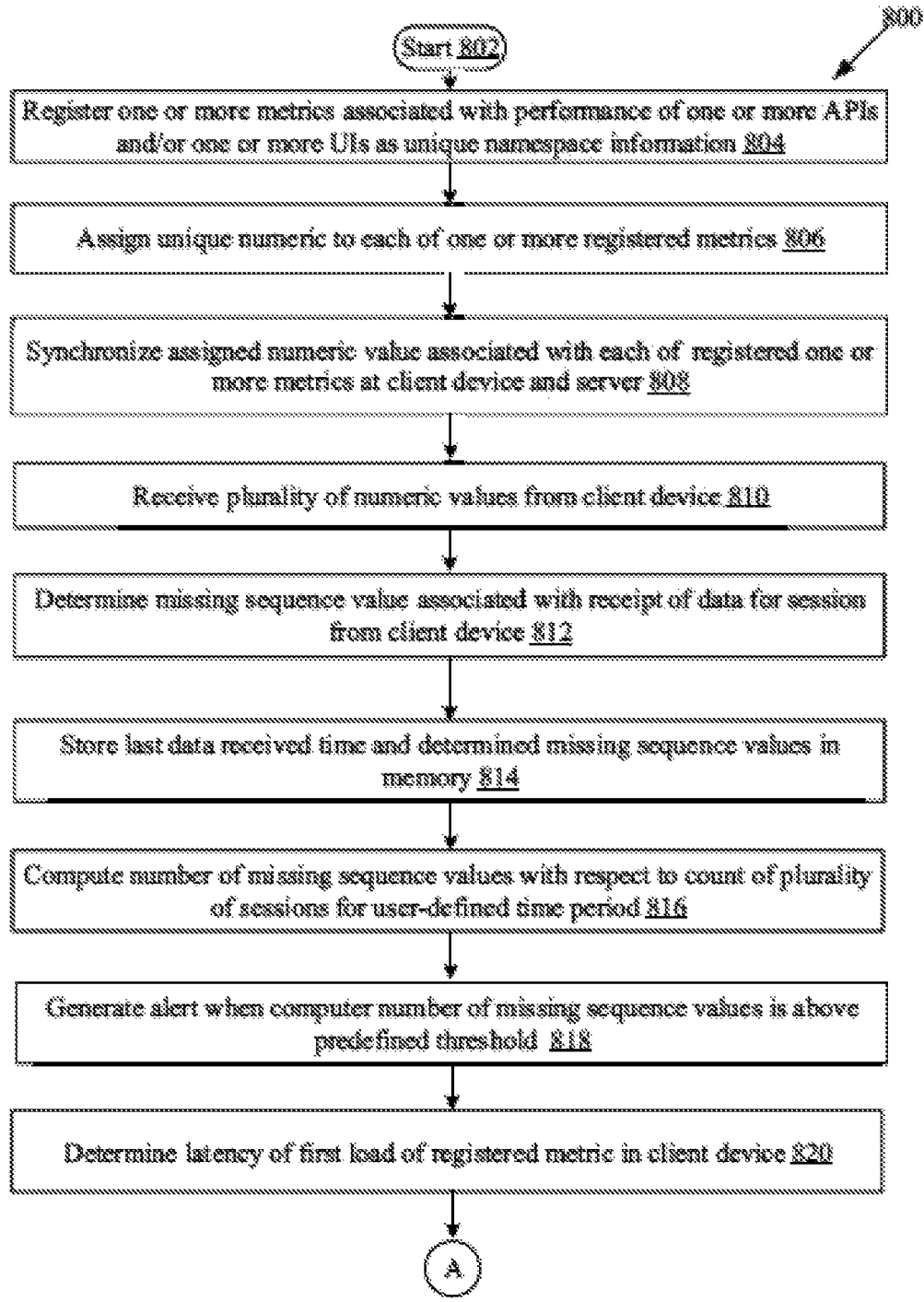
FIGS. 8A and 8B, collectively, illustrate a first flow chart for implementation of an exemplary method to remotely monitor AR performance and user behavior associated with a UI, in accordance with an embodiment of the disclosure.
Figure 8B:
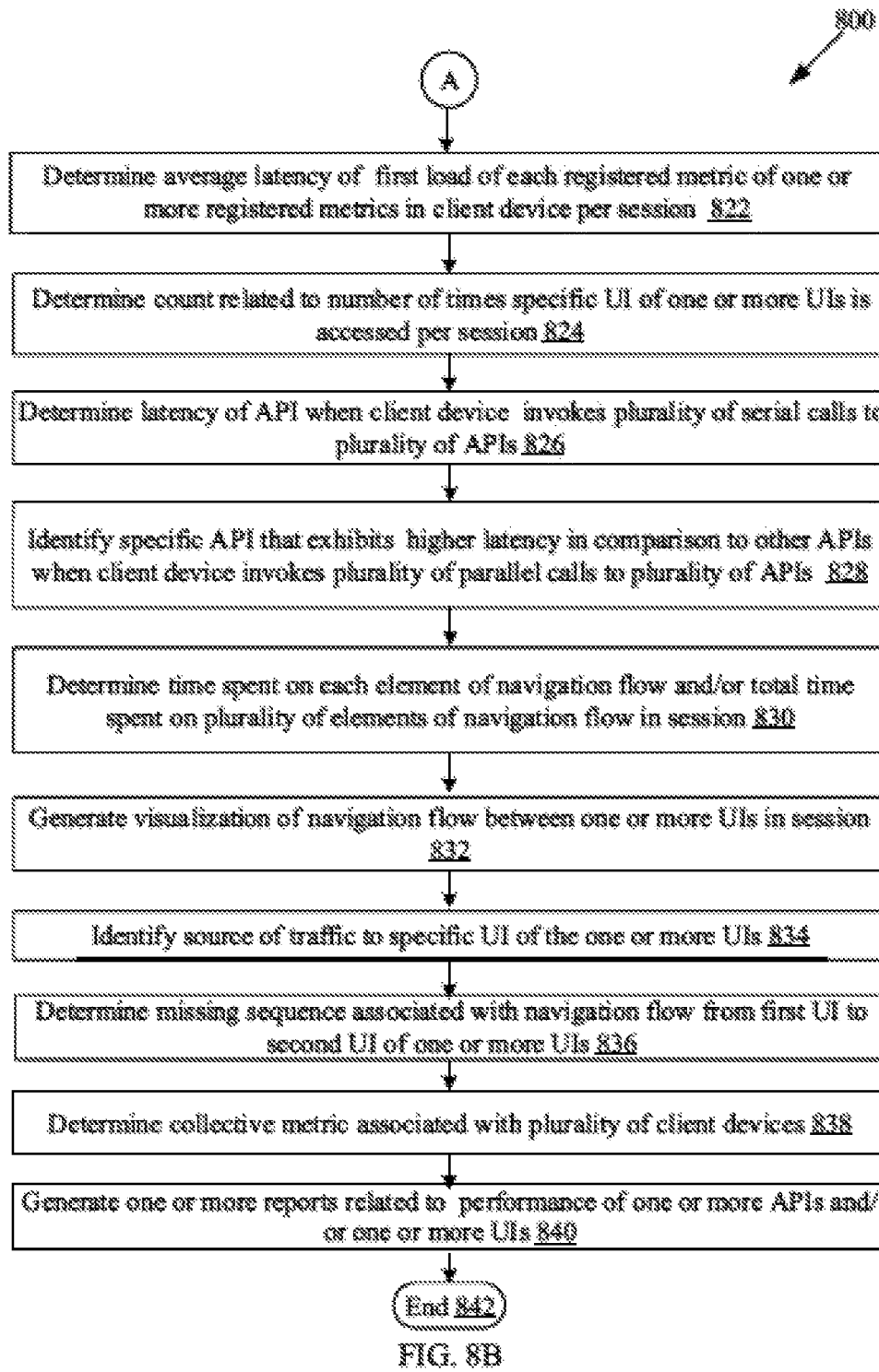

FIG. 8 illustrates a first flow chart for implementation of an exemplary method to remotely monitor API performance and user behavior associated with a UI, in accordance with an embodiment of the disclosure. With reference to FIG. 8, there is shown a flow chart 800. The flow chart 800 is described in conjunction with FIGS. 1 to 5, 8A, 6B, and 7. The method, in accordance with the flowchart 800, may be implemented in the sewer 102. The method starts at step 802 and proceeds to step 804.

At step 804, one or more metrics associated with performance of the one or more APIs 108 and/or the one or more UIs 110 may be registered as a unique namespace information. The one or more APIs 108 and/or the one or more UIs 110 may be associated with the client device 104. The uniqueness of the namespace information may be enforced and checked at the time of registration. At step 806, a unique numeric value may be assigned to each of the one or more registered metrics. The numeric value may be assigned to associate the numeric value with a corresponding registered metric of the one or more registered metrics.

At step 808, the assigned numeric value associated with each of the registered one or more metrics may be synchronized at the client device 104 and the server 102. Accordingly, a relationship may be established between the assigned numeric value and a literal name of the registered metric, on both the client device 104 and the server 102. At step 810, a plurality of numeric values from the client device 104 may be received. Each of the received plurality of numeric values may correspond to a registered metric of the one or more registered metrics.

At step 812, a missing sequence value associated with receipt of data for a session from the client device 104 may be determined. The massing sequence value may be determined based on the received plurality of numeric values for a plurality of sessions. The missing sequence value may correspond to a deviation from a pre-specified sequence for the recent of the data for each session of the plurality of sessions.

At step 814, time of receipt of last data and the determined missing sequence values may be stored in the memory 204. The determined missing sequence values may be used as a quality indicator for data received from the client device 104. An example of the siding windows mechanism to store missing sequence values is given in the Table 5. At step 816, a number of missing sequence values with respect to a count of the plurality of sessions for a user-defined time period, may be computed. The computed number may be a quality indicator for data received from the client device 104.

At step 818, an alert may be generated when the computed number is above a predefined threshold, such as a preset number. At step 820, a latency of a first load of a registered metric in the client device 104 may be determined. The latency of a first load of a registered metric may be determined based on a plurality of numeric values received from the client device 104.

At step 822, the average latency of a first load of each registered metric of the one or more registered metrics in the client device 104 per session, may be determined. At step 824, a count related to number of times a UI of one or more UIs 110 is accessed per session, may be determined.

At step 826, a latency of an API may be determined when the client device 104 invokes a plurality of serial calls to a plurality of APIs. The latency of the API may be determined based on the plurality of numeric values received from the client device 104. The client device 104 may invoke serial calls to more than one APIs, and it may be of interest to determine latency of individual APIs and aggregate of al the APIs in a group that corresponds to a navigation flow. At step 828, a specific API that exhibits a higher latency in comparison to other APIs when the dent device 104 invokes a plurality of parallel calls to the plurality of APIs, may be identified. The identification and determination of the latency may be based on the plurality of numeric values received from the client device 104.

At step 830, time spent on each element of a navigation flow anchor a total time spent on a plurality of elements of the navigation flow in a session, may be determined. The time spent may be determined based on the plurality of numeric values received from the client device 104. At step 832, a visualization of a navigation Row between one or more UIs 110 in a session may be generated.

At step 834, a source of traffic to a specific UI of the one or more UIs 110, may be identified. At step 836, a missing sequence associated with a navigation flow from a first UI to a second UI of the one or more UIs 110 may be determined. The missing sequence may correspond to a deviation from one or more pre-specified navigation flows related to a sequence of visits to one or more functional regions or UIs in a navigational flow in a session. Alternatively, in accordance with an embodiment, a missing sequence associated with a navigation flow within a first UI of the one or more UIs 110, may be determined. The navigation flow within the first UI of the one or more UIs 110 may correspond to navigation Iran one functional region of the first UI to another functional region of the first UI.

At step 838, a collective metric associated with a plurality of client devices may be determined. The collective metric may be determined based on an aggregation and/or filtering of the received plurality of numeric values from the plurality of client devices, such as the client device 104 and/or the second client device 602B. At step 840, one or more reports related to the performance of the one or more APIs 108 and/or the one or more UIs 110 may be dynamically generated. The ore or more reports may be generated based on a conversion of the plurality of numeric values received from the client device 104 in one or more sessions to a plurality of metrics. The conversion of the plurality of numeric values may be performed by use of the unique namespace information that corresponds to each registered metric of the one or more registered metrics. The control may pass to end step 842.

Figure 9:
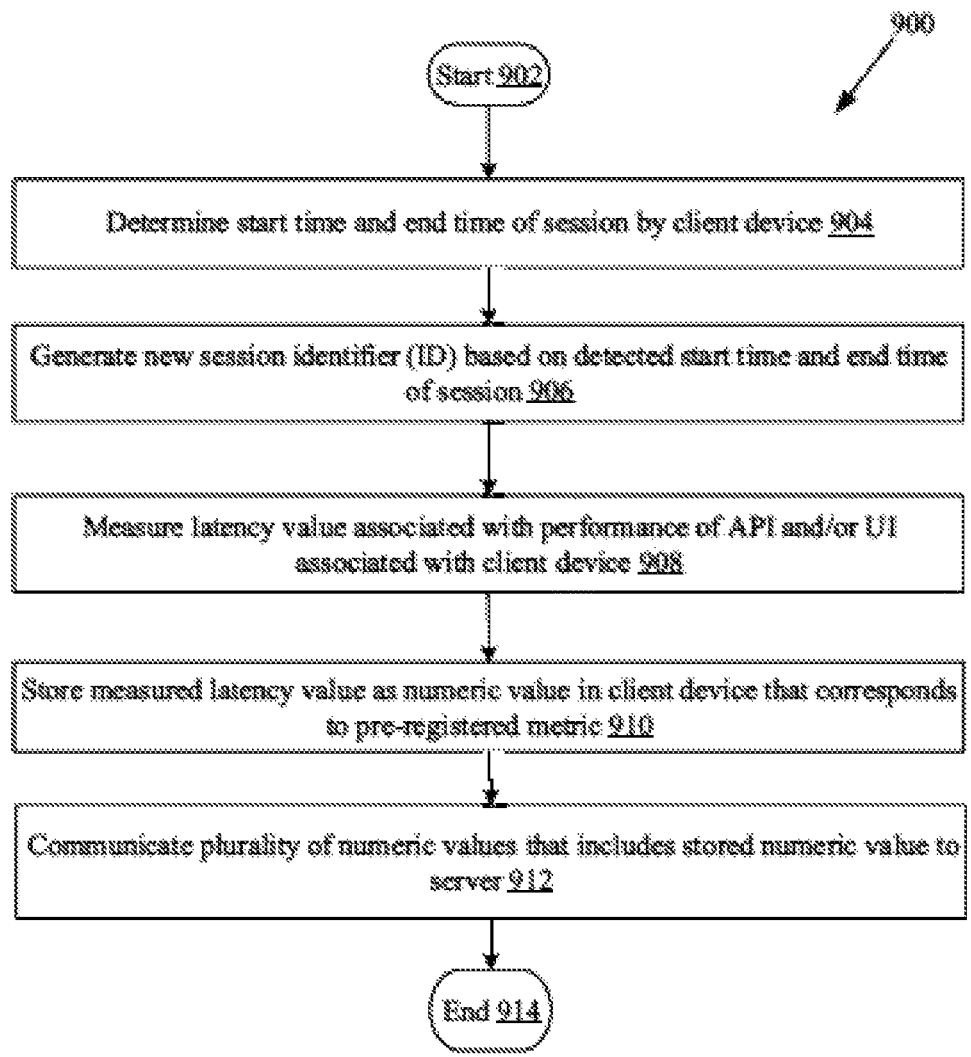
FIG. 9 illustrates a second flow chart for implementation of an exemplary method to monitor API performance and user behavior associated with a UI, in accordance with an embodiment of the disclosure.

FIG. 9 illustrates a second flow chart for implementation of an exemplary method to monitor API performance and user behavior associated with a UI, in accordance with an embodiment of the disclosure With reference to FIG. 9, there is shown a flow chart 900. The flowchart 900 is described in conjunction with FIGS. 1 to 5, 6A, 6B, and 7. The method, in accordance with the flowchart 900, may be implemented in the client device 104. The method starts at step 902 and proceeds to step 904.

At step 904, a start time and an end time of a session may be determined at the client device 104. The start time and the end time of the session may correspond to session boundaries that may be determined based on an initiation of a user activity and/or inactivity for a pre-defined threshold time on a UI. An example of the UI may be the one or more UIs 110 (FIG. 1) or the web application 702 (FIG. 7). The client library 302 (described in FIGS. 3 and 4) may further provide multiple APIs (Table 3) to determine the start time and the end time of metric in the session by use of the stopwatch feature 402.

At step 906, a new session ID may be generated based on the detected start time and the end time of the session. In accordance with an embodiment, the session ID may be a 64-bit random number. The session sequence value may start with "0", and may increase monotonically for every session. Thus, the processor 210 may determine one or more sessions at the client device 104 itself, as described in FIGS. 1, 2B, and 4.

At step 908, a latency value associated with performance of an API anchor the UI associated with the client device 104, may be measured. For example, for the metric ID "5", the latency value may be measured as be "103". Similarly, for the metric ID "7", the latency value may be measured as be "95", as given below.

"Functional_Service. sendLatencyData ([{"metric": 5, "startTimestamp": 1425074929110, "latency" : 103}, {"metric": 7, "startTimestamp" : 1425074929120, "latency" : 95}]);"

At step 910, the measured latency value may be stored as a numeric value that corresponds to a pre-registered metric. In accordance with an embodiment, the client data store may support one or more methods or functions to save session related data associated with the client device 104. Examples of the one or more methods or functions may include, but are not limited to "saveSessionString(string)" and "getSessionString( )".

At step 912, a plurality of numeric values that may include the stored numeric value, which may be communicated to the server 102. The transport feature 404 may package the client data in a certain format as given in Table 4 (FIG. 4), and communicate the packaged data to the server 102, via the communication network 106. The dent data may correspond to the plurality of numeric values (which includes the stored numeric value(s)) at the persistent storage 406. Such communicated client data (as the plurality of numeric values) may enable the server 102 to remotely monitor the performance of the one or more APIs 108 and the one or more UIs 110, associated with the client device 104. The control may pass to the end step 914.

In accordance with an embodiment of the disclosure, the system to remotely monitor API performance aid user behavior associated with a UI, may comprise the server 102 (FIG. 1). The server 102 may comprise one or more circuits, such as the processor 202 (FIG. 2A) The processor 202 may be configured to register a metric associated with performance of an API and/or a UI associated with the client device 104 (FIG. 1), as a unique namespace information value. The processor 202 may be configured to assign a numeric value to the registered metric to associate the assigned numeric value with the metric registered as the unique namespace information value. The processor 202 may be configured to synchronize the assigned numeric value associated with the registered metric at the client device 104 (FIG. 1) and the server 102. The performance of the API and/or the UI associated with the client device 104 may be determined based on receipt of the assigned numeric value from the client device 104.

In accordance with an embodiment of the disclosure, the system to monitor API performance and user behavior associated with a UI may comprise the client device 104 (FIG. 1). The dent device 104 may comprise one or more circuits, such as the processor 210 (FIG. 2B). The processor 210 may be configured to detect a start time and an end time of a session, based on an initiation of a user activity and/or inactivity for a pre-defined threshold time on a UI. The processor 210 may be further configured to generate a new session ID based on the detected start time and the end time of the session. The processor 210 may be further configured to measure a latency value associated with performance of an API (such as the one or more APIs 108 (FIG. 1)) and/or the UI (such as the one or more UIs 110 (FIG. 1)) associated with the client device 104. The processor 210 may be further configured to store the measured latency value as a numeric value that corresponds to a metric. The processor 210 may be further configured to communicate a plurality of numeric values, which includes the stored numeric value to the server 102.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to remotely monitor API performance and user behavior associated with a UI. The set of instructions in the server 102 may cause the machine and/or computer to perform the steps that include registration of a metric associated with performance of an API and/or a UI associated with the client device 104 (FIG. 1). The metric may be registered as a unique namespace information value. A numeric value may be assigned to the registered metric to associate the assigned numeric value with the metric registered as the unique namespace information value. The assigned numeric value associated with the registered metric may be synchronized at the client device 104 and the server 102. The performance of the API and/or the UI associated with the client device 104 may be determined based on receipt of the assigned numeric value from the client device 104.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to monitor API performance and user behavior associated with a UI. The set of instructions in the client device 104 may cause the machine and/or computer to perform the steps that include detection of a start time and an end time of a session based on an initiation of a user activity and/or inactivity for a pre-defined threshold time on a UI (such as one of the one or more UIs 110 (FIG. 1)). A new session ID may be generated based on the detected start time and the end time of the session. A latency value associated with performance of an API (such as one of the one or more APIs 108 (FIG. 1)) and/or the UI associated with the client device 104, may be measured. The measured latency value may be stored as a numeric value that corresponds to a metric. A plurality of numeric values that includes the stored numeric value may be communicated to a server (such as the server 102 or the http web server 304).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system, is able to carry out these methods. Computer program, in the present context, means any expression, in any language, code or notation, of a set of instructions intended to cause a system that has an information processing capability to perform a particular function either directly, or after either or both of the following, a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A system for remote monitoring, said system comprising:
circuitry in a server communicatively coupled to a client device, said circuitry configured to:
register a metric associated with performance of one of an application program interface (API) or at least one user interface (UI) associated with said client device, as a unique namespace information value;
assign a numeric value to said registered metric to associate said assigned numeric value with said metric registered as said unique namespace information value;
synchronize said assigned numeric value associated with said registered metric at said client device and said server, wherein said performance of one of said API or said at least one UI associated with said client device is determined based on receipt of said assigned numeric value from said client device;
generate a visualization of a navigation flow of said at least one UI in a session; and
identify a source of traffic to said at least one UI.

2. The system according to claim 1, wherein said circuitry is further configured to receive a plurality of numeric values that includes said assigned numeric value from said client device, wherein said plurality of numeric values corresponds to at least one of: a transport protocol version, a type of data packet, a session identifier (ID), a session sequence number, a timestamp of a first metric, an application build version value, a client device ID, a current metric numeric value, a previous metric numeric value, a latency value, or a time offset value from said timestamp of said first metric.

3. The system according to claim 1, wherein said server is at least one of: a namespace server, a hypertext transfer protocol (HTTP) web server, an application server, a cluster-computing device, or a database server.

4. The system according to claim 1, wherein said circuitry is further configured to determine a latency of a first load of said registered metric in said client device in said session, based on a plurality of numeric values received from said client device.

5. The system according to claim 1, wherein said circuitry is further configured to determine an average latency of a first load of each registered metric of a plurality of registered metrics, in said client device per session based on a plurality of numeric values received from said client device.

6. The system according to claim 1, wherein said circuitry is further configured to determine a count related to a number of times said at least one UI of is accessed per session.

7. The system according to claim 1, wherein said circuitry is further configured to determine a latency of said API when said client device invokes a plurality of serial calls to a plurality of APIs, based on a plurality of numeric values received from said client device.

8. The system according to claim 1, wherein said circuitry is further configured to identify said API that exhibits a higher latency in comparison to other APIs when said client device invokes a plurality of parallel calls to a plurality of APIs, based on a plurality of numeric values received from said client device.

9. The system according to claim 1, wherein said circuitry is further configured to determine one of a time spent on each element of said navigation flow or a total time spent on a plurality of elements of said navigation flow in said session, based on a plurality of numeric values received from said client device.

10. The system according to claim 1, wherein said circuitry is further configured to dynamically generate at least one report related to one of said performance of said API or user behavior associated with said UI, based on a conversion of a plurality of numeric values received from said client device to a plurality of metrics associated with said unique namespace information value corresponding to each metric.

11. A system for remote monitoring, said system comprising:
circuitry in a server communicatively coupled to a client device, said circuitry configured to:
register at least one metric associated with performance of one of at least one application program interface (API) or at least one user interface (UI) associated with said client device;
assign a unique numeric value to each of said at least one registered metric to associate said assigned unique numeric value with a corresponding registered metric of said at least one registered metric;
receive a plurality of first numeric values from said client device, wherein each of said received plurality of first numeric values corresponds to a registered metric of said at least one registered metric;
generate a visualization of a navigation flow of said at least one UI in a first session of a plurality of sessions; and
identify a source of traffic to said at least one UI; and
determine a missing sequence value associated with receipt of data for said first session from said client device based on said received plurality of first numeric values for at least one second session of said plurality of sessions, wherein said missing sequence value corresponds to a deviation from a specified sequence for said receipt of said data for each session of said plurality of sessions.

12. The system according to claim 11, wherein each of said at least one metric is registered as a unique namespace information value.

13. The system according to claim 11, wherein said at least one UI corresponds to one of at least one cross-linked webpage or at least one UI of a software application accessed from said client device, wherein said at least one cross-linked webpage includes at least one functional region.

14. The system according to claim 11, wherein said circuitry is further configured to:
compute a number of missing sequence values with respect to a count of said plurality of sessions for a user-defined time period, wherein said computed number is a quality indicator for said data received from said client device; and
generate an alert when said computed number is above a threshold.

15. The system according to claim 11, wherein said circuitry is further configured to determine a missing sequence associated with one of said navigation flow within a first UI of said at least one UI or said navigation flow from said first UI to a second UI of said at least one UI, based on said received plurality of first numeric values, wherein said missing sequence corresponds to a deviation from at least one specified navigation flow related to a sequence of user visits to at least one functional region associated with said at least one UI in said first session.

16. The system according to claim 15, wherein said navigation flow within said first UI of said at least one UI corresponds to navigation from a first functional region of said first UI to a second functional region of said first UI.

17. The system according to claim 11, wherein said circuitry is further configured to determine a collective metric associated with a plurality of client devices based on one of aggregation or filtering of said received plurality of first numeric values from said client device and plurality of second numeric values received from remaining client devices of said plurality of client devices.

* * * * *